United States Patent
Tsubata

(10) Patent No.: US 8,531,620 B2
(45) Date of Patent: Sep. 10, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 13/132,654

(22) PCT Filed: Sep. 3, 2009

(86) PCT No.: PCT/JP2009/065424
§ 371 (c)(1),
(2), (4) Date: Jun. 3, 2011

(87) PCT Pub. No.: WO2010/067648
PCT Pub. Date: Jun. 17, 2010

(65) Prior Publication Data
US 2011/0248273 A1    Oct. 13, 2011

(30) Foreign Application Priority Data

Dec. 9, 2008   (JP) .................................. 2008-313045

(51) Int. Cl.
*G02F 1/136*    (2006.01)
*G02F 1/1343*   (2006.01)
(52) U.S. Cl.
USPC ............................................ 349/48; 349/144
(58) Field of Classification Search
USPC ................................................... 349/48, 144
See application file for complete search history.

(56) References Cited

U.S. PATENT DOCUMENTS

| 7,843,520 B2* | 11/2010 | Lu et al. ........................ 349/38 |
| 2003/0007107 A1 | 1/2003 | Chae et al. |
| 2005/0036091 A1 | 2/2005 | Song |
| 2005/0162893 A1 | 7/2005 | Yagi et al. |
| 2005/0168664 A1 | 8/2005 | Chae et al. |

(Continued)

FOREIGN PATENT DOCUMENTS

| EP | 2 322 983 A1 | 5/2011 |
| JP | 2005-062882 A | 3/2005 |

(Continued)

OTHER PUBLICATIONS

Official Communication issued in International Patent Application No. PCT/JP2009/065424, mailed on Oct. 20, 2009.

*Primary Examiner* — James Dudek
(74) *Attorney, Agent, or Firm* — Keating & Bennett, LLP

(57) ABSTRACT

In each pixel region, (i) a first pixel electrode (17a) connected to a first transistor (12a), (ii) a second pixel electrode (17b) connected to a second transistor (17b), (iii) a coupling electrode (67y), and (iv) first and second capacitor electrodes (67x and 67z) provided in a layer in which a data signal line (15) is provided, being provided, a capacitor being defined by the coupling electrode (67y) and the second pixel electrode (17b), the coupling electrode (67y) being connected to the first pixel electrode (17a) via a third transistor (112), the first capacitor electrode (67x) and a retention capacitor line (18) overlapping each other via a gate insulating film, the first capacitor electrode (67x) being connected to the first pixel electrode (17a), the second capacitor electrode (67z) and the retention capacitor line (18) overlapping each other via the gate insulating film, the second capacitor electrode (67z) being connected to the second pixel electrode (17b). This allows an increase in pixel aperture ratio of a capacitively coupled active matrix substrate having three transistors.

13 Claims, 35 Drawing Sheets

(56) References Cited

U.S. PATENT DOCUMENTS

| | | |
|---|---|---|
| 2006/0023137 A1 | 2/2006 | Kamada et al. |
| 2006/0169983 A1 | 8/2006 | Sawamizu et al. |
| 2007/0058097 A1 | 3/2007 | Kato et al. |
| 2007/0146600 A1 | 6/2007 | Song |
| 2008/0309841 A1 | 12/2008 | Yagi et al. |
| 2009/0065778 A1 | 3/2009 | Tsubata et al. |
| 2010/0182528 A1 | 7/2010 | Song |
| 2011/0025937 A1 | 2/2011 | Yagi et al. |

FOREIGN PATENT DOCUMENTS

| | | |
|---|---|---|
| JP | 2006-039290 A | 2/2006 |
| JP | 2007-148345 A | 6/2007 |
| KR | 10-2005-0077727 A | 8/2005 |
| WO | 03/036374 A1 | 5/2003 |
| WO | 2007/108181 A1 | 9/2007 |

* cited by examiner

F I G. 1 3
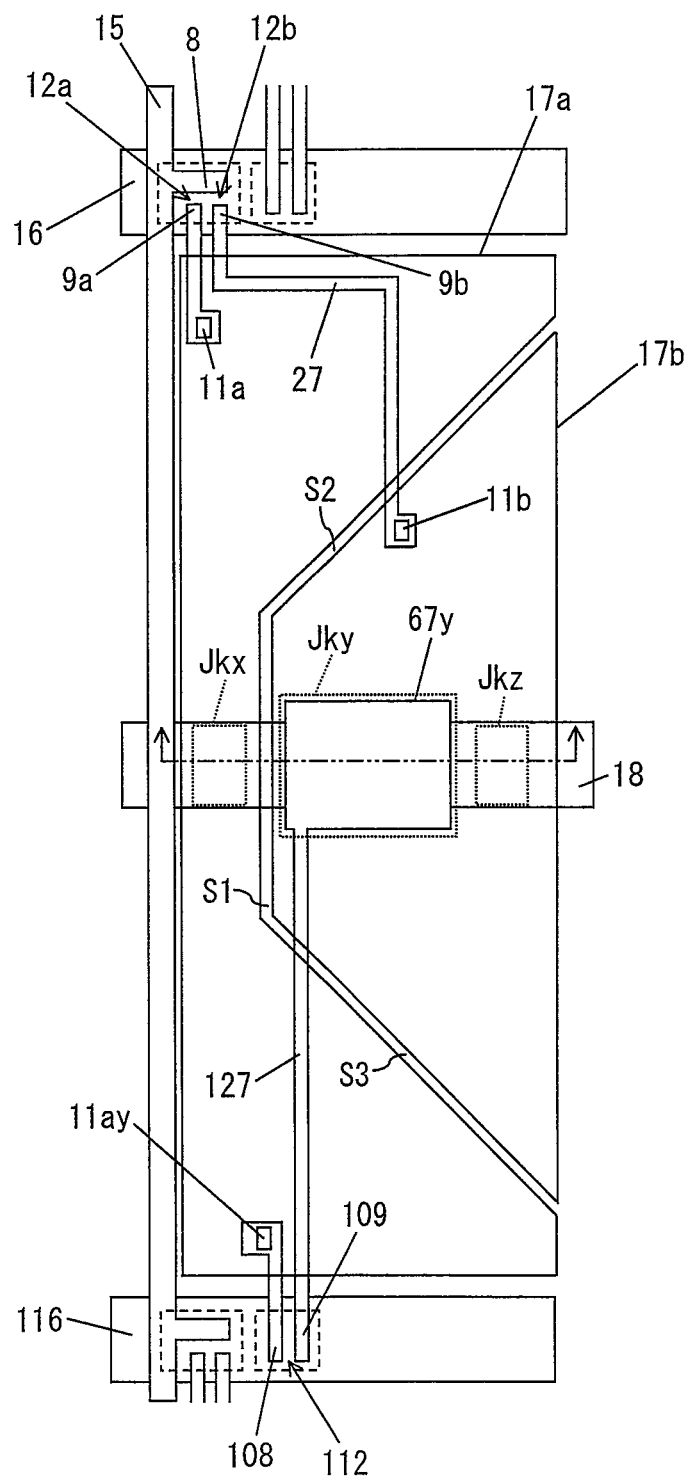

F I G. 1 4
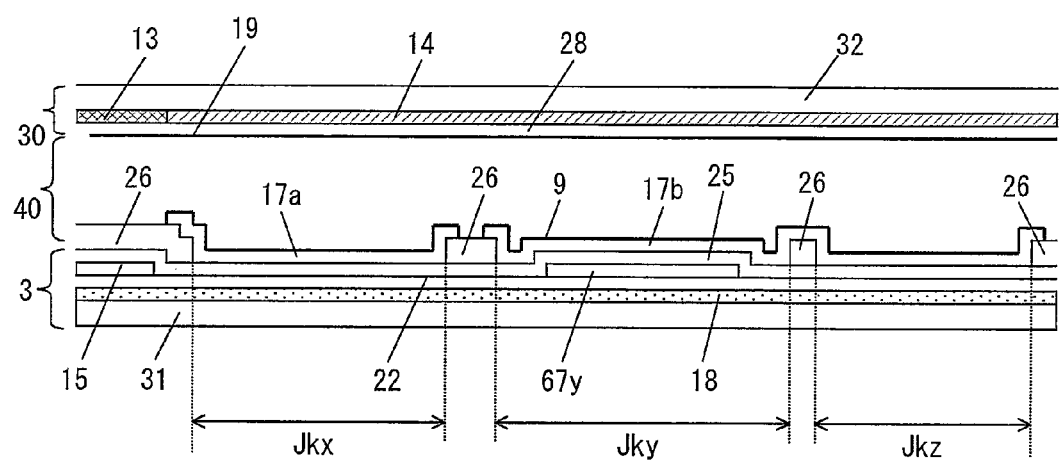

F I G. 1 6
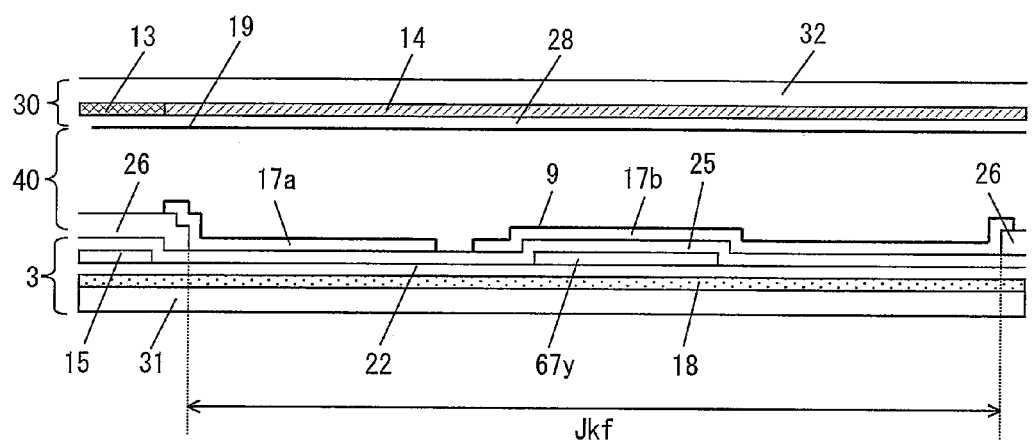

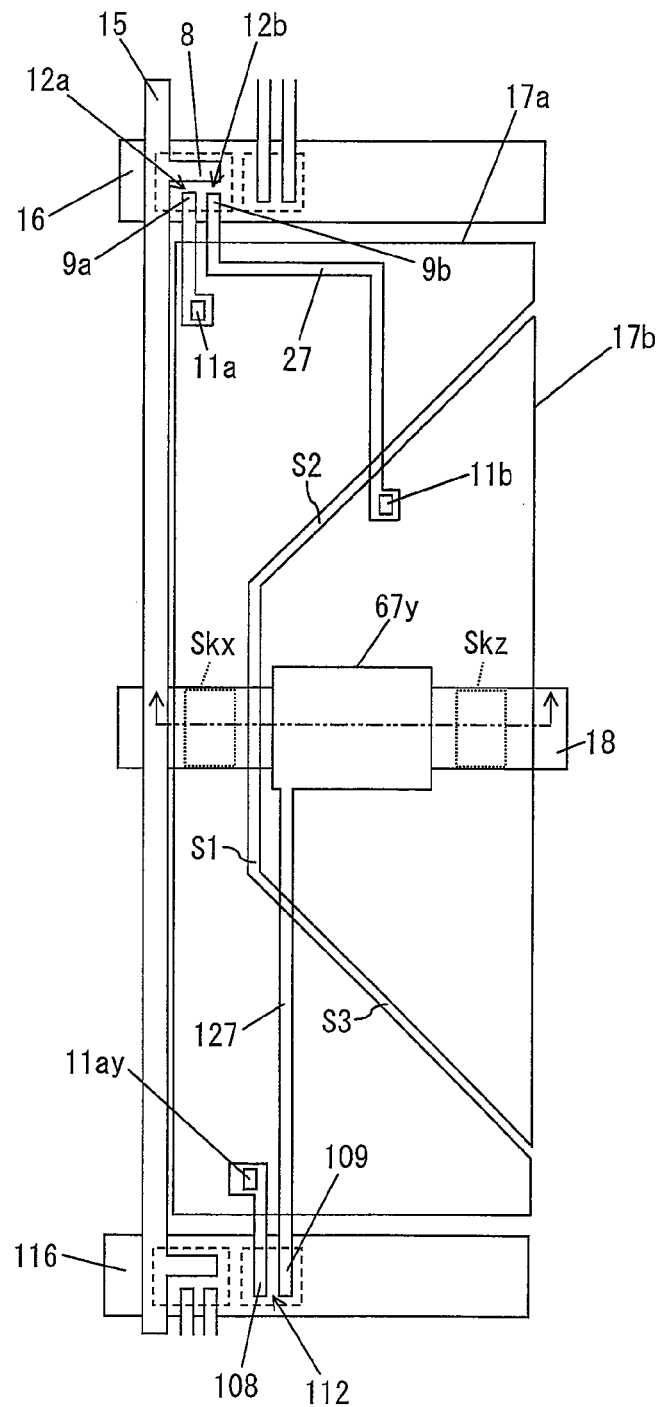
F I G. 1 7

F I G. 2 1
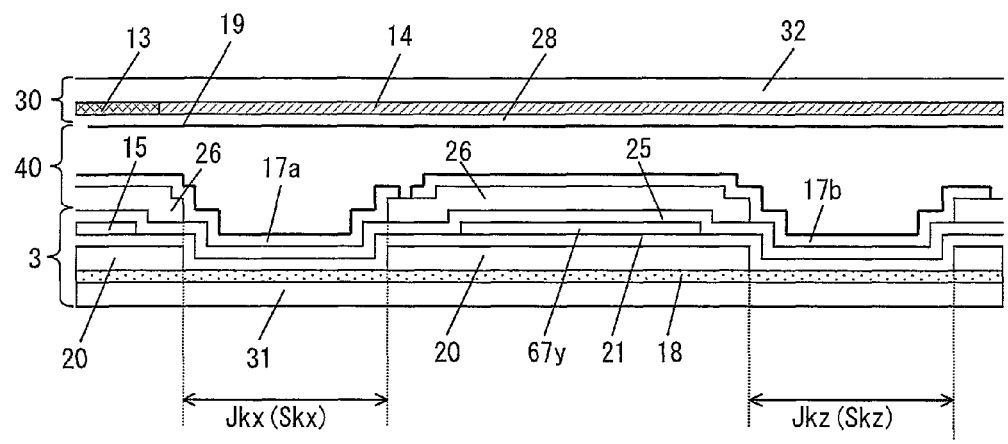

F I G. 2 2
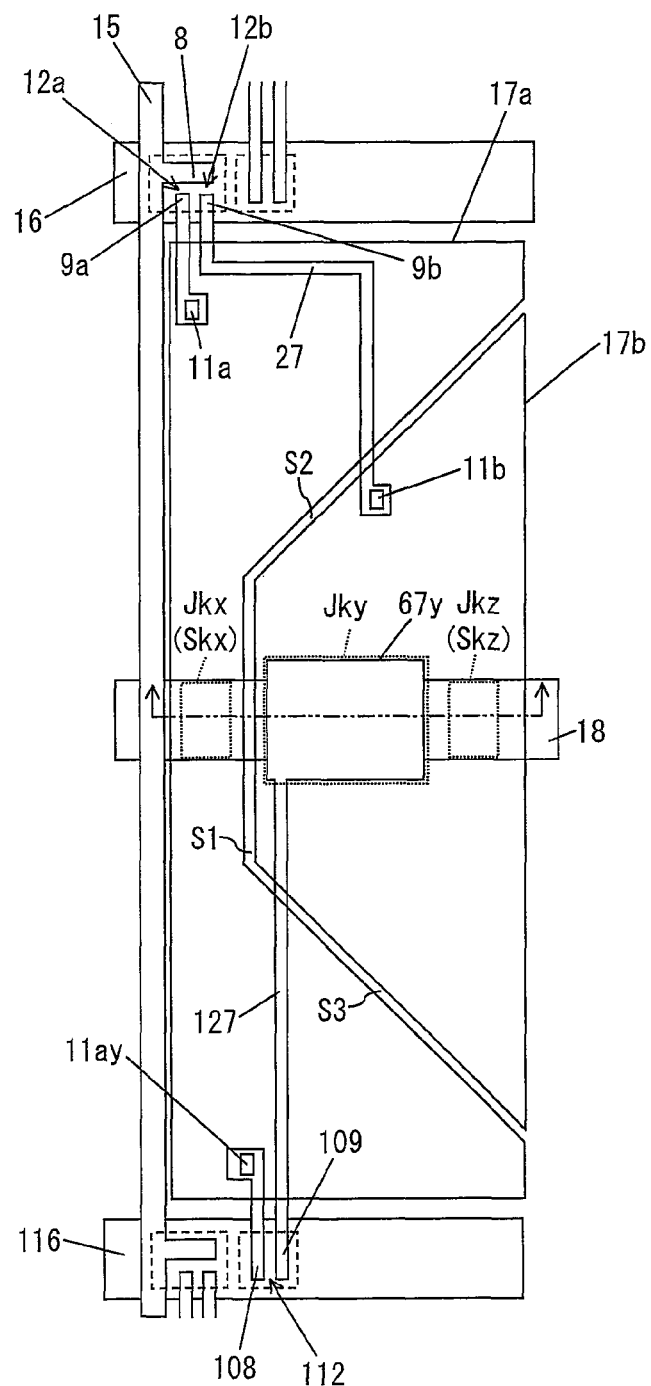

F I G. 2 3
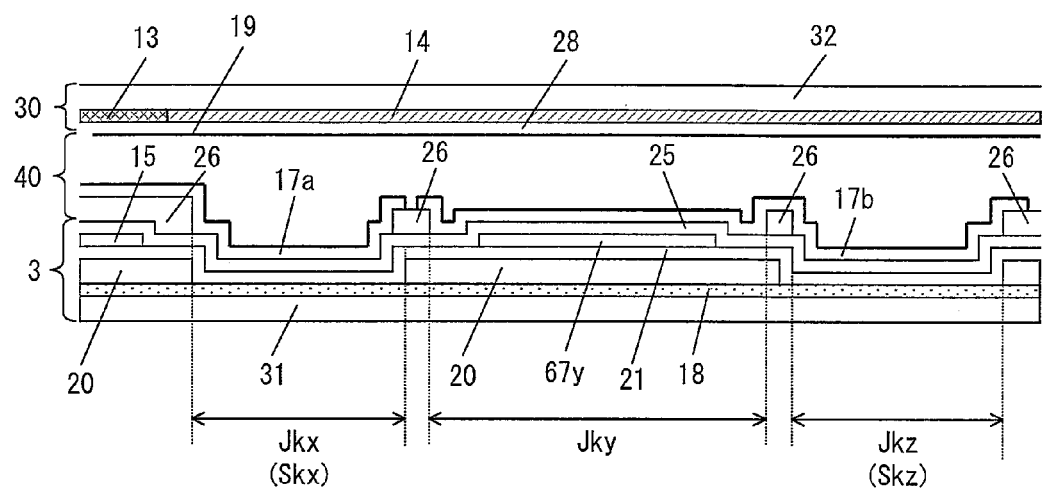

F I G. 2 6
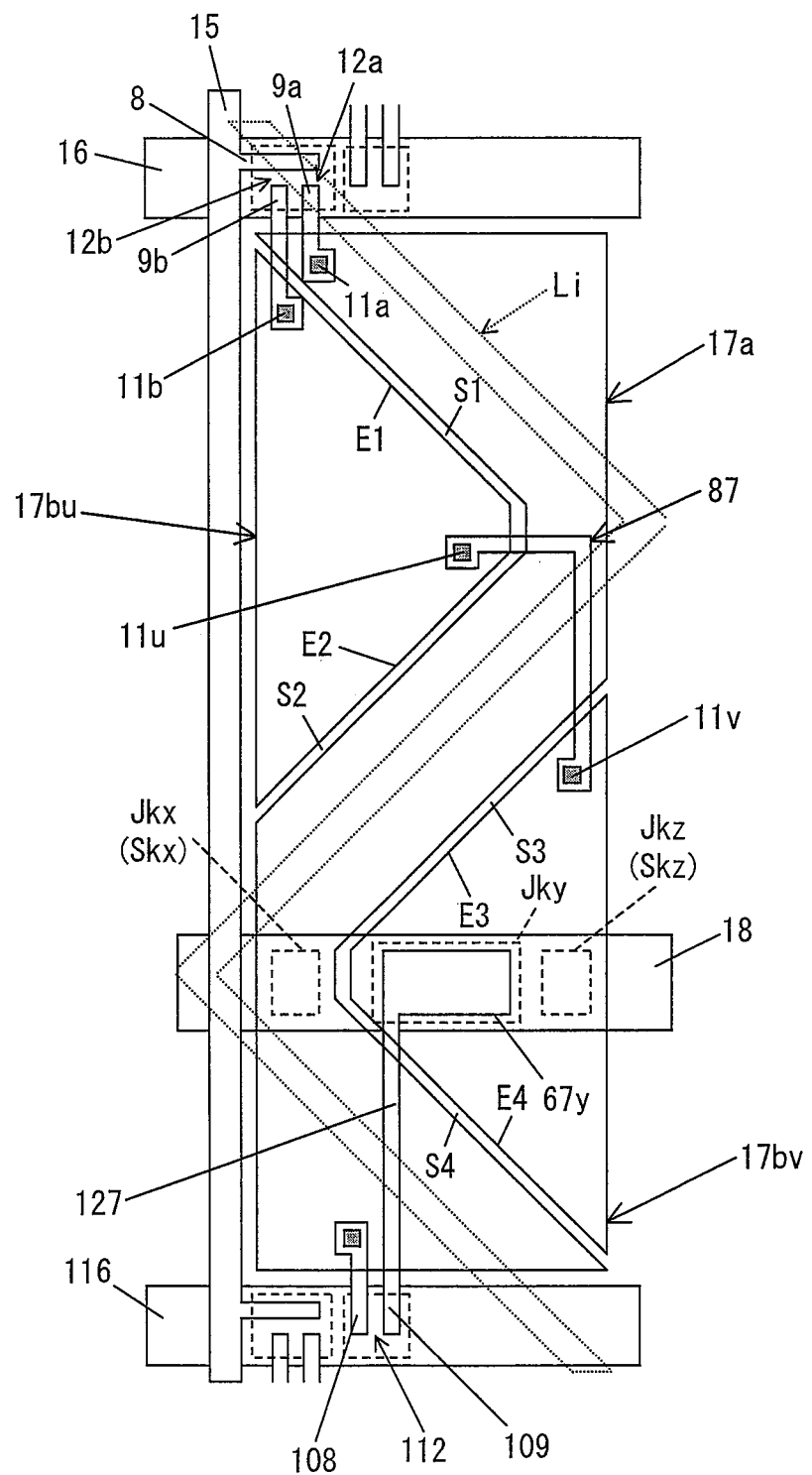

F I G. 3 1
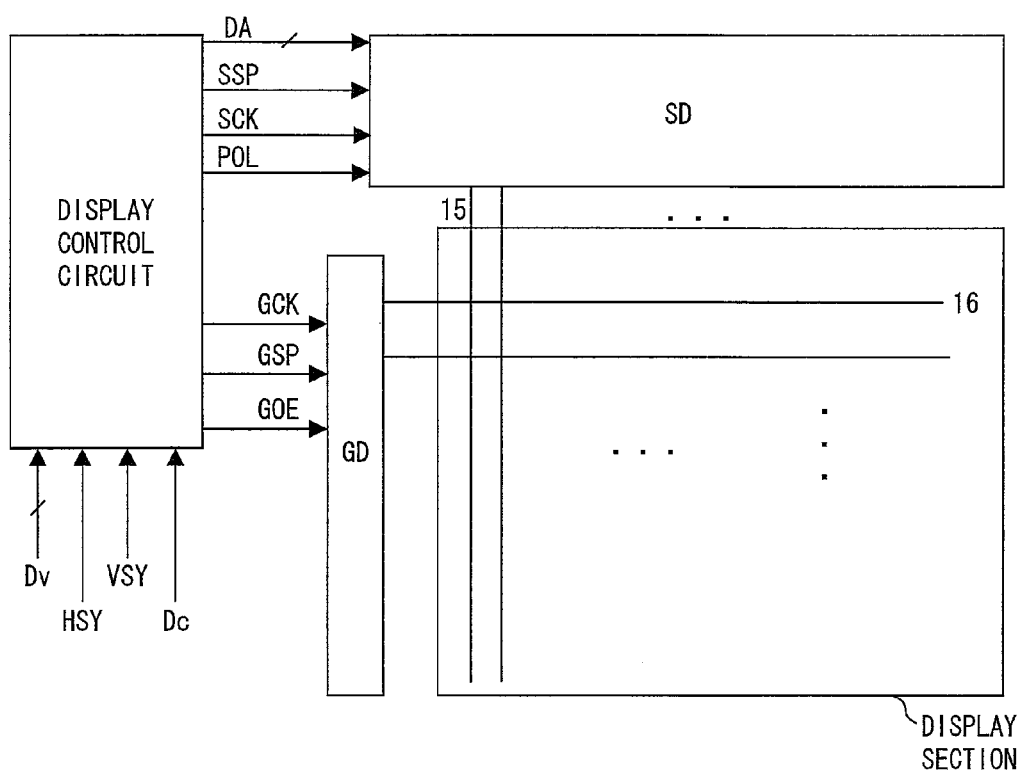

F I G. 3 7
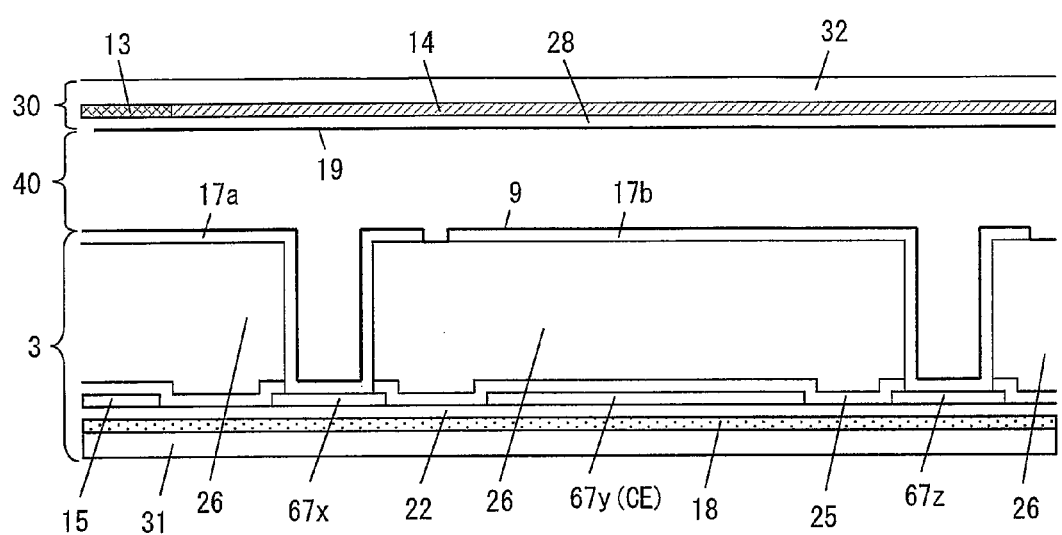

ACTIVE MATRIX SUBSTRATE, LIQUID CRYSTAL PANEL, LIQUID CRYSTAL DISPLAY UNIT, LIQUID CRYSTAL DISPLAY DEVICE, AND TELEVISION RECEIVER

TECHNICAL FIELD

The present invention relates to an active matrix substrate in which a plurality of pixel electrodes are provided in one (1) pixel (multi-domain), and to a liquid crystal display device in which the active matrix substrate is used.

BACKGROUND ART

In order to improve a viewing angle dependence of a γ characteristic in a liquid crystal display device (e.g., to alleviate excess brightness on a screen etc.), a liquid crystal display device (multi-domain liquid crystal display device) has been suggested such that halftone is displayed by area coverage modulation for a plurality of subpixels provided in one (1) pixel which are controlled to have different brightnesses (refer to Patent Literature 1, for example).

An active matrix substrate described in Patent Literature 1 (see FIGS. 38 and 39) is arranged as follows: One and the other of two transistors connected to a scanning signal line 215 are connected to a first pixel electrode 190a and a second pixel electrode 190b, respectively. A capacitor is defined by the second pixel electrode 190b and a coupling electrode 176. The coupling electrode 176 and the first pixel electrode 190a are connected via a transistor which is connected to a scanning signal line 216 to be scanned subsequently to the scanning signal line 215. (The active matrix substrate is a so-called capacitively coupled active matrix substrate having three transistors.) A storage capacitor is defined by a part in which the first pixel electrode 190a and a first storage electrode 133a overlap each other via a gate insulating layer 140 and a protection layer 11, and a storage capacitor is defined by a part in which the second pixel electrode 190b and a second storage electrode 133b overlap each other via the gate insulating layer 140 and the protection layer 11.

According to a liquid crystal display device in which such an active matrix substrate is used, a subpixel which corresponds to the first pixel electrode 190a and a subpixel which corresponds to the second pixel electrode 190b can serve as a dark subpixel and a bright subpixel, respectively, so that halftone can be displayed by area coverage modulation for each dark subpixel and each bright subpixel.

Citation List

Patent Literature 1
Japanese Patent Application Publication, Tokukai, No. 2005-62882 A (Publication Date: Mar. 10, 2005)

SUMMARY OF INVENTION

Technical Problem

However, according to the active matrix substrate (see FIGS. 38 and 39), the protection layer 11, which is thick, is provided in the parts in which the storage capacitors are defined. Therefore, in order to secure a storage capacitance, the part in which the first storage electrode 133a and the first pixel electrode 190a overlap each other and the part in which the second storage electrode 133b and the second pixel electrode 190b overlap each other need to be large. This has been a cause for a decrease in aperture ratio (pixel aperture ratio).

An object of the present invention is to increase a pixel aperture ratio of a capacitively coupled active matrix substrate having three transistors.

Solution to Problem

An active matrix substrate of the present invention includes: data signal lines extending in a column direction; scanning signal lines extending in a row direction; each first transistor connected to a corresponding one of the data signal lines and a corresponding one of the scanning signal lines; each second transistor connected to the corresponding one of the data signal lines and the corresponding one of the scanning signal lines; each third transistor connected to a scanning signal line adjacent to the corresponding one of the scanning signal lines; and retention capacitor lines, in each pixel region, (i) a first pixel electrode connected to the each first transistor, (ii) a second pixel electrode connected to the each second transistor, (iii) a coupling electrode, and (iv) first and second capacitor electrodes provided in a layer in which the corresponding one of the data signal lines is provided, being provided, a capacitor being defined by the coupling electrode and the second pixel electrode, the coupling electrode being connected to the first pixel electrode via the each third transistor, the first capacitor electrode and a corresponding one of the retention capacitor lines overlapping each other via a first insulating film, the first capacitor electrode being connected to the first pixel electrode, the second capacitor electrode and the corresponding one of the retention capacitor lines overlapping each other via the first insulating film, the second capacitor electrode being connected to the second pixel electrode.

According to the active matrix substrate of the present invention, a first retention capacitor is defined by a part in which the first capacitor electrode and the corresponding one of the retention capacitor lines overlap each other via the first insulating film, and a second retention capacitor is defined by a part in which the second capacitor electrode and the corresponding one of the retention capacitor lines overlap each other via the first insulating film. The insulator parts of the respective first and second retention capacitors are thinner as compared to the case of the conventional arrangement (see FIG. 36). Accordingly, it is possible to secure a required retention capacitance even if a retention capacitor line which is light blocking has a smaller area (e.g., even if a retention capacitor line has a smaller width). This allows an increase in pixel aperture ratio.

The active matrix substrate of the present invention can be arranged such that: the coupling electrode and the second pixel electrode overlap each other via a second insulating film; and the first capacitor electrode and the first pixel electrode are connected via a first contact hole which is through the second insulating film, and the second capacitor electrode and the second pixel electrode are connected via a second contact hole which is through the second insulating film.

The active matrix substrate of the present invention can be arranged such that whole of the first capacitor electrode and the corresponding one of the retention capacitor lines overlap each other, and whole of the second capacitor electrode and the corresponding one of the retention capacitor lines overlap each other.

The active matrix substrate of the present invention can be arranged such that the coupling electrode and the corresponding one of the retention capacitor lines overlap each other via the first insulating film.

The active matrix substrate of the present invention can be arranged such that the first capacitor electrode, the coupling electrode, and the second capacitor electrode are provided in the row direction in this order.

The active matrix substrate of the present invention can be arranged such that the first insulating film is a gate insulating film.

The active matrix substrate of the present invention can be arranged such that the second insulating film is an interlayer insulating film which covers a channel of a transistor.

The active matrix substrate of the present invention can be arranged such that a region of the interlayer insulating film is provided thinner than its surrounding region, the region being at least a part in which the interlayer insulating film and each of the coupling electrode and the second pixel electrode overlap each other.

The active matrix substrate of the present invention can be arranged such that: the interlayer insulating film has a structure in which an inorganic interlayer insulating film and an organic interlayer insulating film are stacked; and in said region of the interlayer insulating film, the organic interlayer insulating film is provided thinner than the surrounding region or the organic interlayer insulating film is removed.

An active matrix substrate of the present invention can be arranged to include: data signal lines extending in a column direction; scanning signal lines extending in a row direction; each first transistor connected to a corresponding one of the data signal lines and a corresponding one of the scanning signal lines; each second transistor connected to the corresponding one of the data signal lines and the corresponding one of the scanning signal lines; each third transistor connected to a scanning signal line adjacent to the corresponding one of the scanning signal lines; and retention capacitor lines, in each pixel region, (i) a first pixel electrode connected to the each first transistor, (ii) a second pixel electrode connected to the each second transistor, and (iii) a coupling electrode, being provided, each of the first and second pixel electrodes and a corresponding one of the retention capacitor lines overlapping one another, a capacitor being defined by the coupling electrode and the second pixel electrode, the coupling electrode being connected to the first pixel electrode via the each third transistor, at least a first region of an insulating layer and at least a second region of the insulating layer being provided thinner than their surrounding regions, the insulating layer being provided between a layer in which the corresponding one of the retention capacitor lines is provided and a layer in which the first and second pixel electrodes are provided, the first region being at least a part in which the insulating layer and each of the corresponding one of the retention capacitor lines and the first pixel electrode overlap each other, and the second region being at least a part in which the insulating layer and each of the corresponding one of the retention capacitor lines and the second pixel electrode overlap each other.

According to the active matrix substrate of the present invention, a first retention capacitor is defined by a part in which the first pixel electrode and the corresponding one of the retention capacitor lines overlap each other via a first thin part of the insulating layer, and a second retention capacitor is defined by a part in which the second pixel electrode and the corresponding one of the retention capacitor lines overlap each other via a second thin part of the insulating layer. The insulator parts of the respective first and second retention capacitors are thinner as compared to the case of the conventional arrangement (see FIG. 36). Accordingly, it is possible to secure a required retention capacitance even if a retention capacitor line which is light blocking has a smaller area (e.g., even if a retention capacitor line has a smaller width). This allows an increase in pixel aperture ratio.

The active matrix substrate of the present invention can be arranged such that the insulating layer has a structure in which a gate insulating film and an interlayer insulating film which covers a channel of a transistor are stacked.

The active matrix substrate of the present invention can be arranged such that the interlayer insulating film is removed in (i) said first region of the insulating film and (ii) said second region of the insulating film.

The active matrix substrate of the present invention can be arranged such that the interlayer insulating film is provided thinner, than in the surrounding regions, in (i) said first region of the insulating film and (ii) said second region of the insulating film.

The active matrix substrate of the present invention can be arranged such that: the interlayer insulating film has a structure in which an inorganic interlayer insulating film and an organic interlayer insulating film are stacked; and in (i) said first region of the interlayer insulating film and (ii) said second region of the interlayer insulating film, the organic interlayer insulating film is provided thinner than the surrounding regions or the organic interlayer insulating film is removed.

The active matrix substrate of the present invention can be arranged such that the gate insulating film is removed in (i) said first region of the insulating film and (ii) said second region of the insulating film.

The active matrix substrate of the present invention can be arranged such that the gate insulating film is provided thinner, than in the surrounding regions, in (i) said first region of the insulating film and (ii) said second region of the insulating film.

The active matrix substrate of the present invention can be arranged such that: the gate insulating film has a structure in which an organic gate insulating film and an inorganic gate insulating film are stacked; and in (i) said first region of the gate insulating film and (ii) said second region of the gate insulating film, the organic gate insulating film is provided thinner than the surrounding regions or the organic gate insulating film is removed.

The active matrix substrate of the present invention can be arranged such that the coupling electrode and the second pixel electrode overlap each other via the interlayer insulating film.

The active matrix substrate of the present invention can be arranged such that the coupling electrode and the corresponding one of the retention capacitor lines overlap each other via the gate insulating film.

The active matrix substrate of the present invention can be arranged such that a region of the interlayer insulating film is provided thinner than its surrounding region, the region being at least a part in which the interlayer insulating film and each of the coupling electrode and the second pixel electrode overlap each other.

The active matrix substrate of the present invention can be arranged such that: the interlayer insulating film has a structure in which an inorganic interlayer insulating film and an organic interlayer insulating film are stacked; and in said region of the interlayer insulating film, the organic interlayer insulating film is provided thinner than the surrounding region or the organic interlayer insulating film is removed.

The active matrix substrate of the present invention can be arranged such that a gap between the first and second pixel electrodes serves as an alignment controlling structure.

A liquid crystal panel of the present invention includes: an active matrix substrate mentioned above; and a counter substrate which faces the active matrix substrate, the counter substrate having a surface from which a region on the surface, corresponding to a part in which the insulating layer has a thin thickness, protrudes.

The liquid crystal panel of the present invention is arranged such that: the retention capacitor lines extend in the row direction; and the region is located between two edges of the corresponding one of the retention capacitor lines which extend in the row direction when the region is projected onto the layer in which the corresponding one of the retention capacitor lines is provided.

An active matrix substrate of the present invention includes: data signal lines; scanning signal lines; each first transistor connected to a corresponding one of the data signal lines and a corresponding one of the scanning signal lines; each second transistor connected to the corresponding one of the data signal lines and the corresponding one of the scanning signal lines; third transistors, each of which connected to a scanning signal line adjacent to the corresponding one of the scanning signal lines; and retention capacitor lines, in each pixel region, (i) a first pixel electrode connected to the each first transistor, (ii) a second pixel electrode connected to the each second transistor, and (iii) first and second capacitor electrodes and a control electrode each provided in a layer in which the corresponding one of the data signal lines is provided, being provided, the control electrode and a corresponding one of the retention capacitor lines overlapping each other via a first insulating film, the first capacitor electrode and the corresponding one of the retention capacitor lines overlapping each other via the first insulating film, the first capacitor electrode being connected to the first pixel electrode, the second capacitor electrode and the corresponding one of the retention capacitor lines overlapping each other via the first insulating film, the second capacitor electrode being connected to the second pixel electrode, and the control electrode being connected to the second pixel electrode via the each third transistor.

In this case, an active matrix substrate of the present invention can be arranged to further include a second insulating film which (i) is provided in a layer between (a) a layer in which channels of the each first transistor and the each second transistor are provided and (b) a layer in which the first and second pixel electrodes are provided, (ii) contains an organic matter, and (iii) is (e.g., not less than five or ten times) thicker than the first insulating film. The active matrix substrate of the present invention can be arranged such that the control electrode and the first or second pixel electrode overlap each other via the second insulating film.

A liquid crystal panel of the present invention includes an active matrix substrate mentioned above. A liquid crystal display unit of the present invention includes: a liquid crystal panel mentioned above; and a driver. A liquid crystal display device of the present invention includes: a liquid crystal display unit mentioned above; and a light source apparatus. A television receiver of the present invention includes: a liquid crystal display device mentioned above; and a tuner section for receiving television broadcast.

Advantageous Effects of Invention

As described earlier, according to the active matrix substrate of the present invention, it is possible to secure a required retention capacitance even if a retention capacitor line (which is light blocking) has a smaller area (e.g., even if the retention capacitor line has a smaller width). This allows an increase in pixel aperture ratio.

BRIEF DESCRIPTION OF DRAWINGS

FIG. 13
FIG. 13 is a plan view illustrating a modification of the liquid crystal panel of FIG. 10.
FIG. 14
FIG. 14 is an example of a cross-sectional view, taken on the line indicated by arrows of the liquid crystal panel illustrated in FIG. 13.
FIG. 16
FIG. 16 is an example of a cross-sectional view, taken on the line indicated by arrows of the liquid crystal panel illustrated in FIG. 15.
FIG. 17
FIG. 17 is a plan view illustrating a third arrangement example of the liquid crystal panel of the present invention.

FIG. 20 is a plan view a fourth arrangement example of the liquid crystal panel of the present invention.

FIG. 21

FIG. 21 is an example of a cross-sectional view, taken on the line indicated by arrows of the liquid crystal panel illustrated in FIG. 20.

FIG. 22

FIG. 22 is a plan view illustrating a modification of the liquid crystal panel of FIG. 20.

FIG. 23

FIG. 23 is an example of a cross-sectional view, taken on the line indicated by arrows of the liquid crystal panel illustrated in FIG. 22.

FIG. 24 is a plan view illustrating a fifth arrangement example of the liquid crystal panel of the present invention.

FIG. 25 is a plan view illustrating a sixth arrangement example of the liquid crystal panel of the present invention.

FIG. 26

FIG. 26 is a plan view illustrating a modification of the liquid crystal panel of FIG. 25.

FIG. 27 is a plan view illustrating a modification of the liquid crystal panel of FIG. 12.

FIG. 28 is an example of a cross-sectional view, taken on the line indicated by arrows of the liquid crystal panel illustrated in FIG. 27.

FIG. 29 is another example of the cross-sectional view, taken on the line indicated by arrows of the liquid crystal panel illustrated in FIG. 27.

Figure 30:
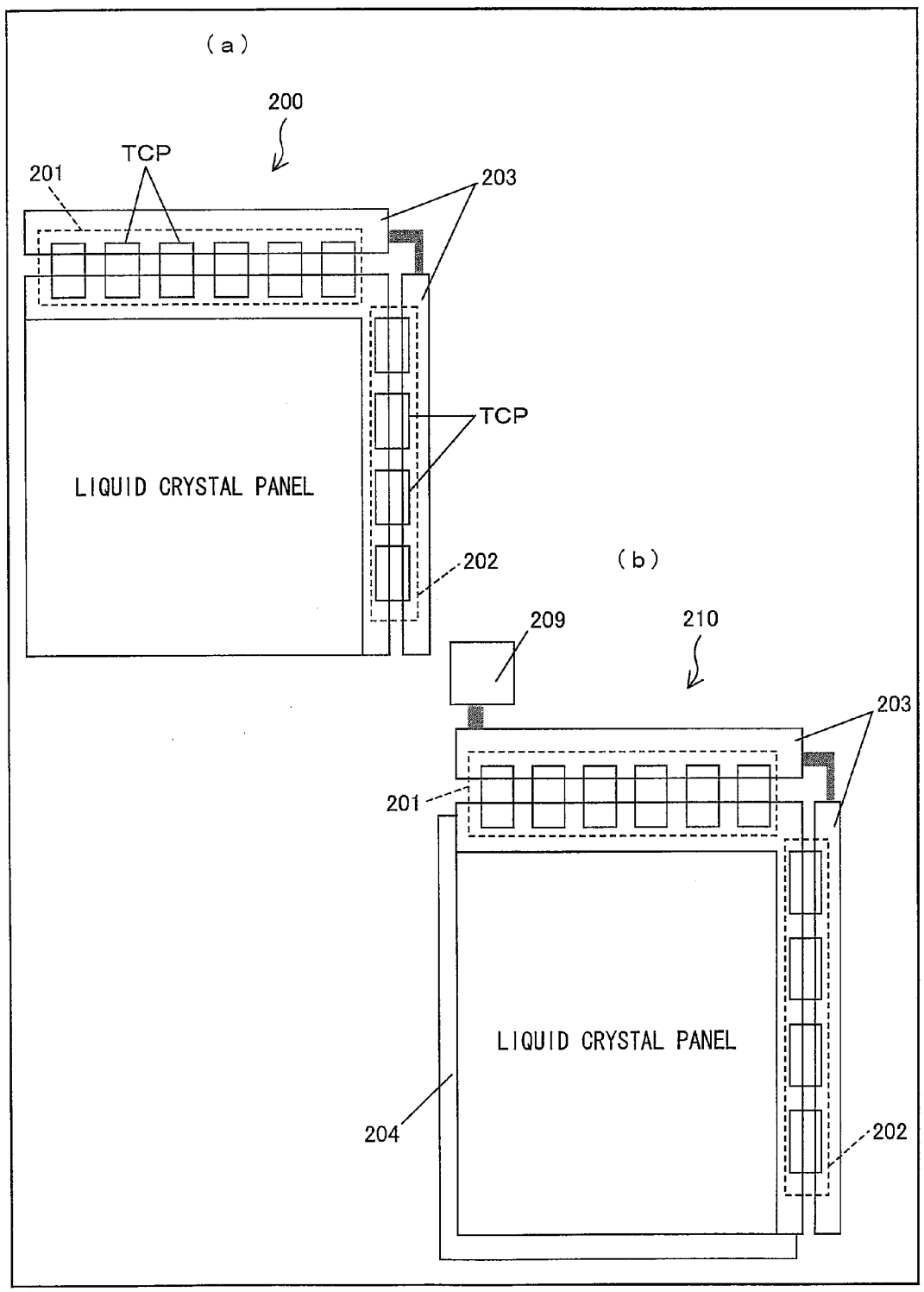
FIG. 30

(a) of FIG. 30 is a schematic view illustrating an arrangement of a liquid crystal display unit of the present invention, and (b) of FIG. 30 is a schematic view illustrating an arrangement of a liquid crystal display device of the present invention.

FIG. 31

FIG. 31 is a block diagram illustrating an overall arrangement of the liquid crystal display device of the present invention.

FIG. 32

Figure 32:
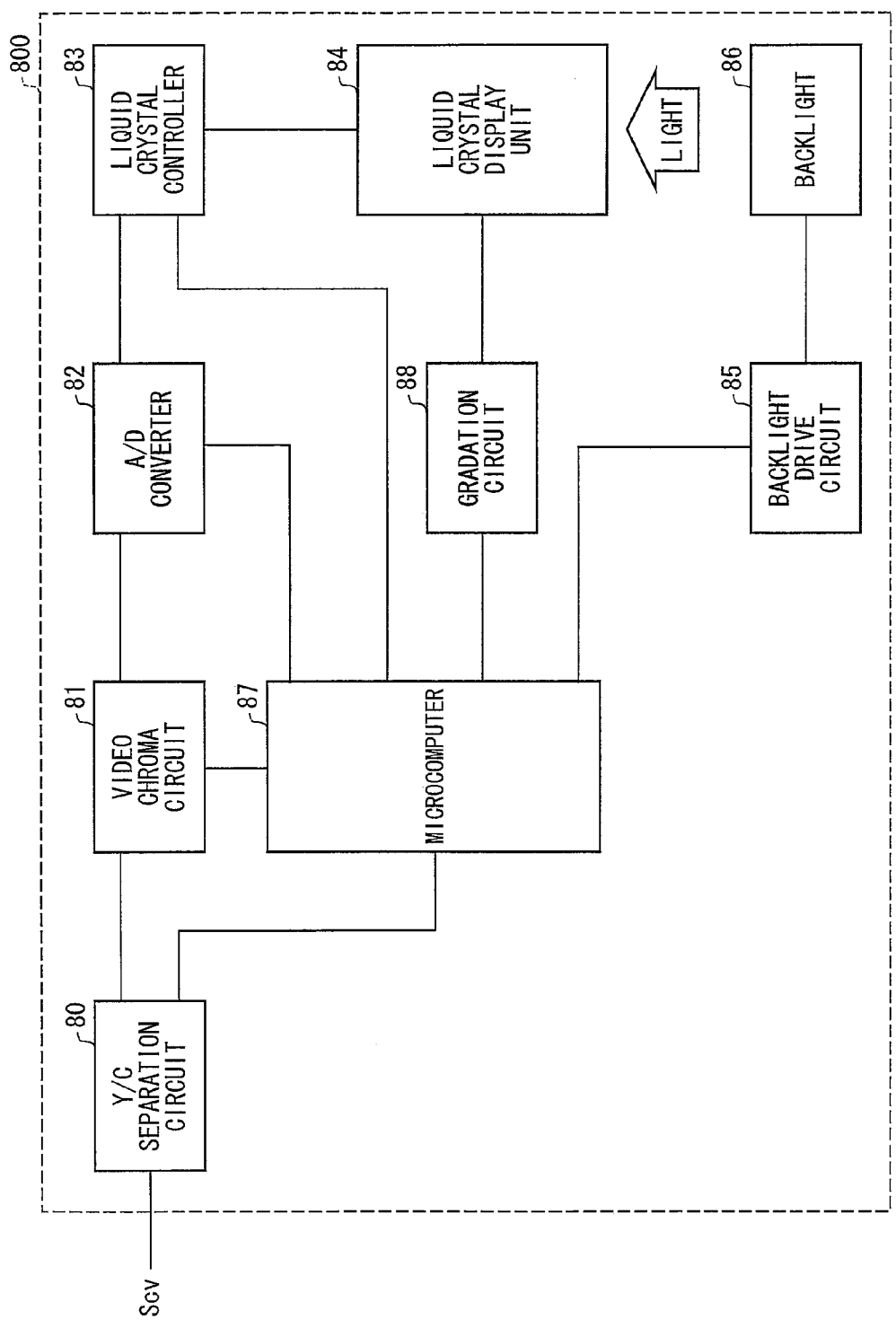

FIG. 32 is a block diagram illustrating a function of the liquid crystal display device of the present invention.

FIG. 33

Figure 33:
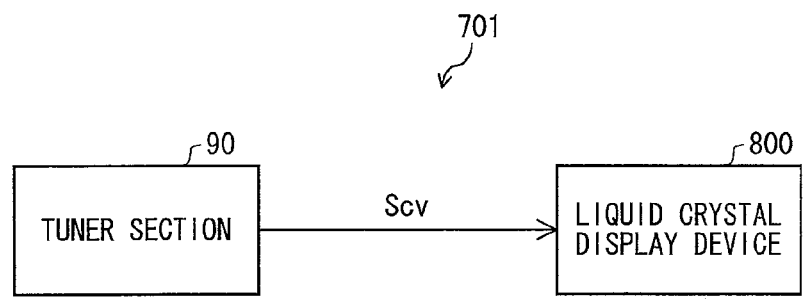

FIG. 33 is a block diagram illustrating a function of a television receiver of the present invention.

FIG. 34

Figure 34:
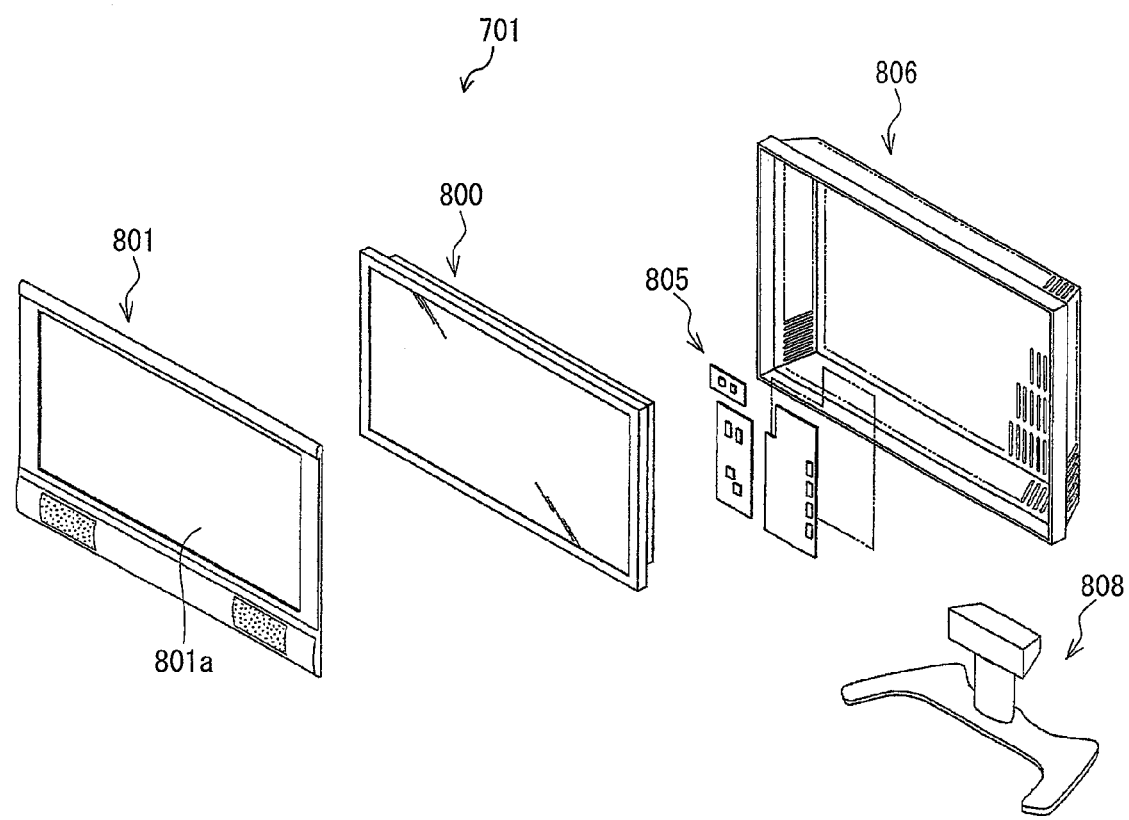

FIG. 34 is an exploded perspective view illustrating an arrangement of the television receiver of the present invention.

FIG. 35

Figure 35:
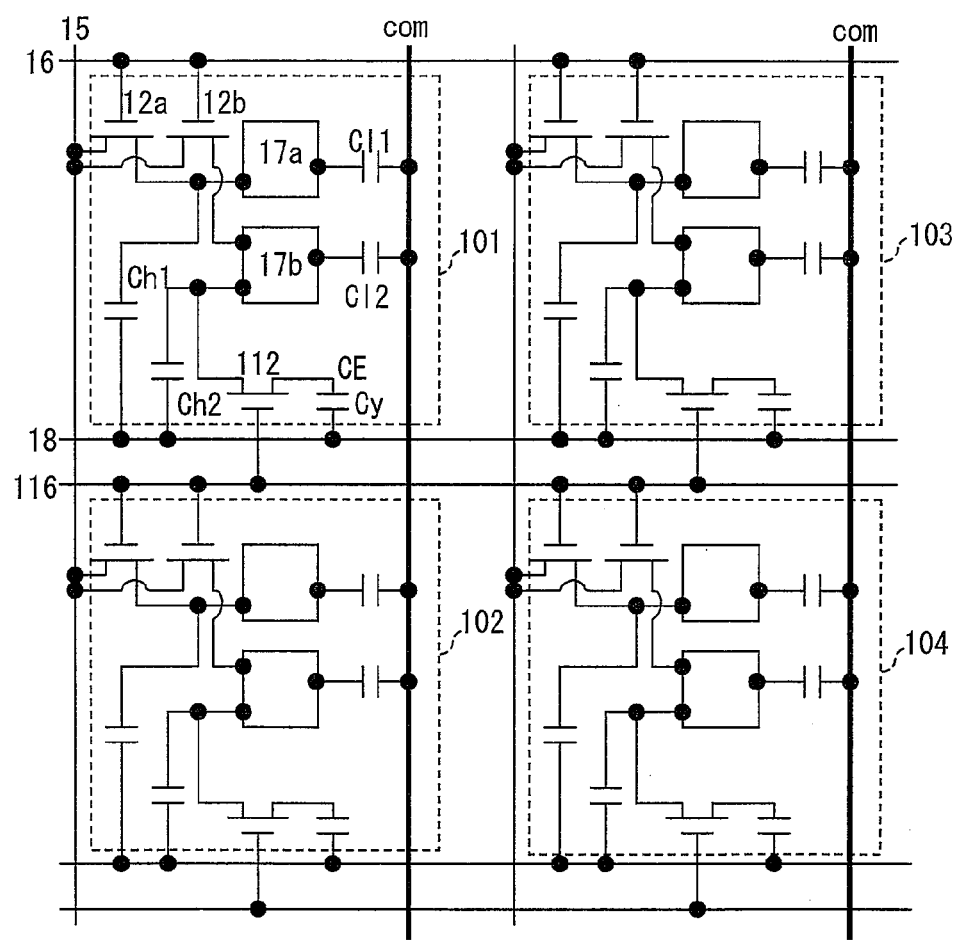

FIG. 35 is another equivalent circuit diagram of the liquid crystal panel of the present invention.

FIG. 36

Figure 36:
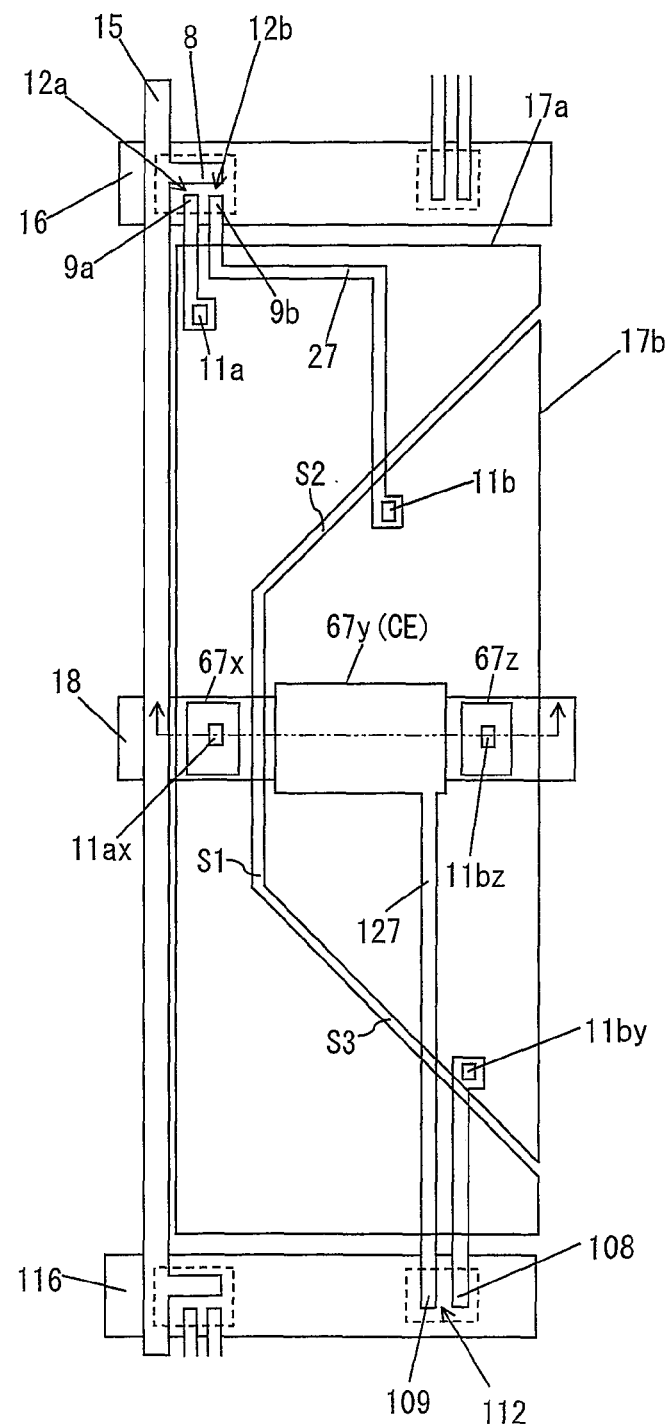

FIG. 36 is a plan view illustrating an arrangement example of the liquid crystal panel of FIG. 35.

FIG. 37

FIG. 37 is a cross-sectional view, taken on the line indicated by arrows of the liquid crystal panel illustrated in FIG. 36.

FIG. 38

Figure 38:
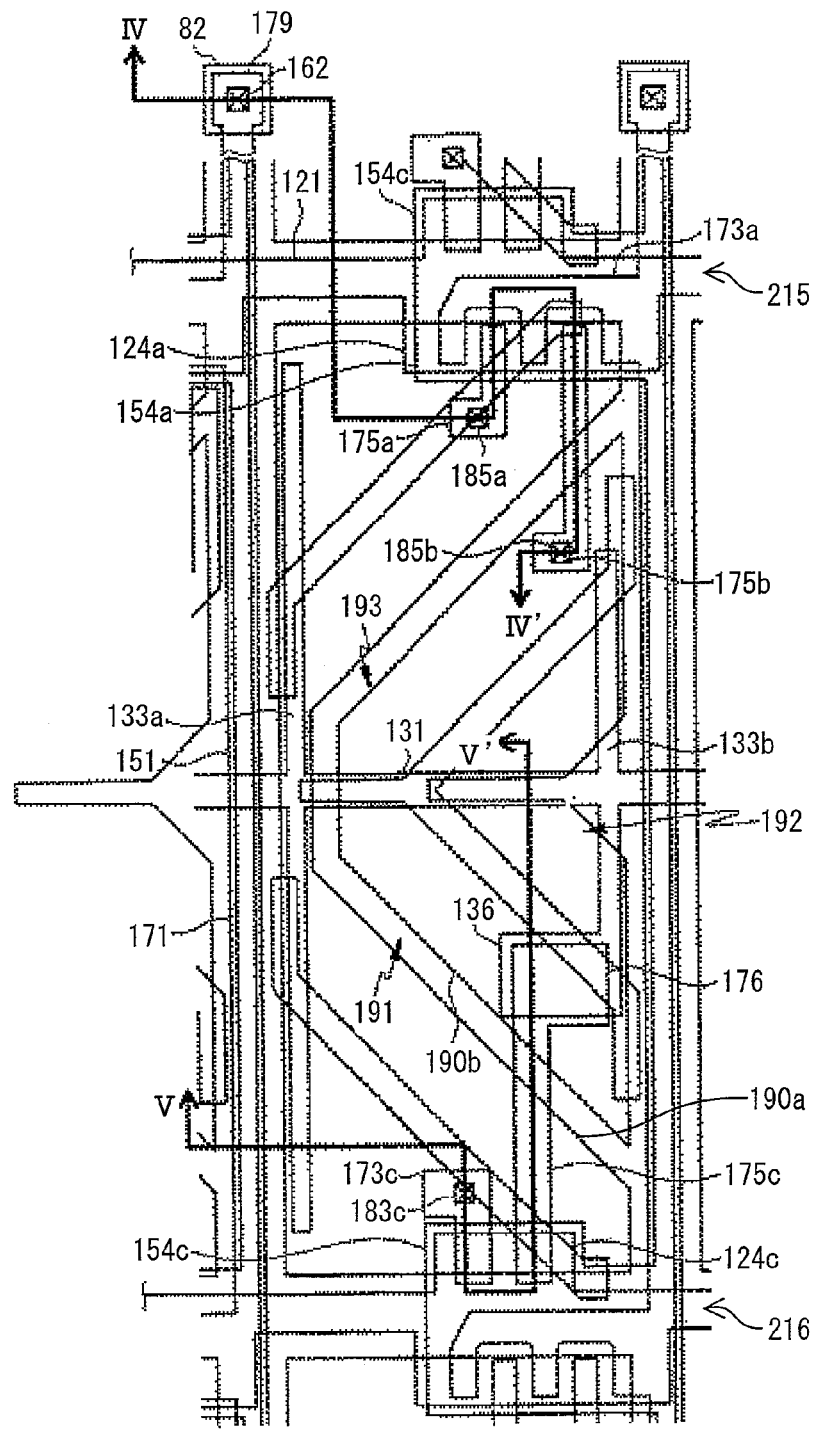

FIG. 38 is a plan view illustrating an arrangement of a conventional liquid crystal panel.

FIG. 39

Figure 39:
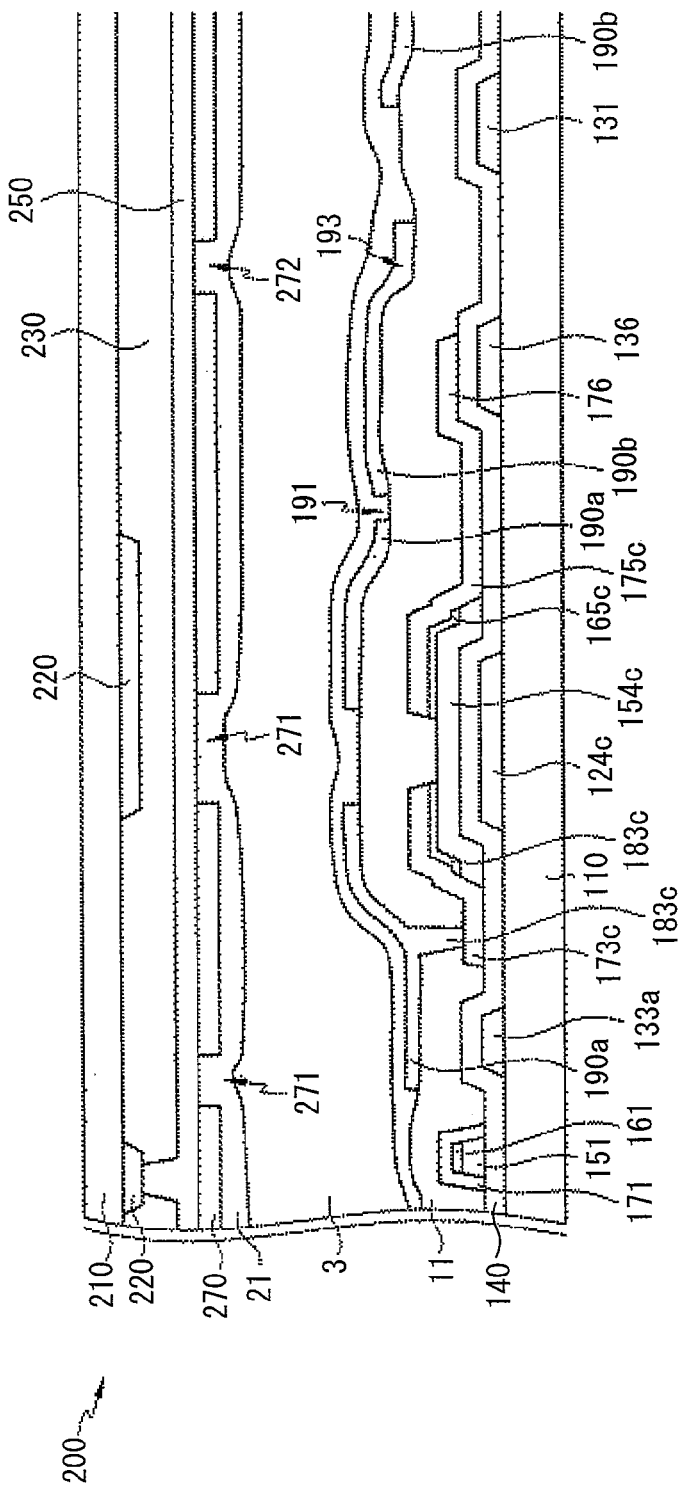

FIG. 39 is a cross-sectional view illustrating the arrangement of the conventional liquid crystal panel.

DESCRIPTION OF EMBODIMENTS

Examples of an embodiment according to the present invention are described below with reference to FIGS. 1 through 37. Note that, for convenience, a direction in which scanning signal lines extend is hereinafter assumed to be a row direction. Note, however, that it goes without saying that scanning signal lines of a liquid crystal display device including a liquid crystal panel of the present embodiment (or an active matrix substrate used in the liquid crystal panel) can extend either transversely or longitudinally in a state in which the liquid crystal display device is used (viewed). Note also that illustration of an alignment controlling structure is appropriately omitted in the drawings of liquid crystal panels.

Figure 3:
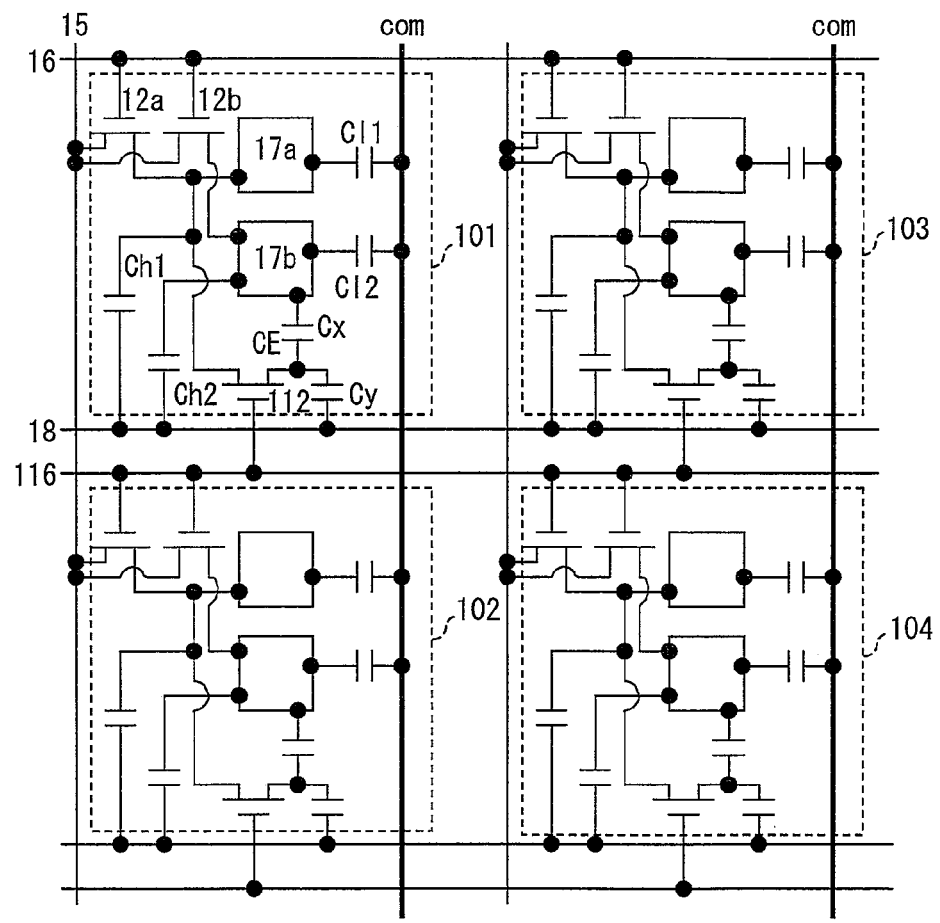
FIG. 3
FIG. 3 is an equivalent circuit diagram illustrating the liquid crystal panel of FIG. 1.

FIG. 3 is an equivalent circuit diagram illustrating a part of a liquid crystal panel of the present embodiment. The liquid crystal panel of the present embodiment includes data signal lines 15 which extend in a column direction (a vertical direction in FIG. 3), scanning signal lines 16 and 116 which extend in the row direction (a horizontal direction in FIG. 3), pixels (101 through 104) which are aligned in the row and column directions, retention capacitor lines 18, and a common electrode (counter electrode) com, and the pixels have identical structures (see FIG. 3). A pixel column to which the pixels 101 and 102 belong and a pixel column to which the pixels 103 and 104 belong are adjacent to each other, and a pixel row to which the pixels 101 and 103 belong and a pixel row to which the pixels 102 and 104 belong are adjacent to each other.

The liquid crystal panel of the present embodiment is a so-called capacitively coupled liquid crystal panel having three transistors. One (1) data signal line 15, one (1) scanning signal line 16, three transistors, and one (1) retention capacitor line 18 are provided for each of the pixels, and the each of the pixels includes two pixel electrodes (17a and 17b).

For example, the pixel 101 is arranged as follows: The pixel electrode 17a (a first pixel electrode) is connected to a data signal line 15 via a transistor 12a (a first transistor) which is connected to a scanning signal line 16. The pixel electrode 17b (a second pixel electrode) is connected to the data signal line 15 via a transistor 12b (a second transistor) which is connected to the scanning signal line 16. A coupling capacitor (Cx) is defined by a coupling electrode CE (a control electrode) and the pixel electrode 17b. The coupling electrode CE is connected to the pixel electrode 17a via a transistor 112 (a third transistor) which is connected to a scanning signal line 116 (a scanning signal line to be scanned subsequently to the scanning signal line 16). A capacitor (Cy) is defined by the coupling electrode CE and a retention capacitor line 18. A retention capacitor (Ch1) is defined by the pixel electrode 17a (including its electrically connected part) and the retention capacitor line 18. A retention capacitor (Ch2) is defined by the pixel electrode 17b (including its electrically connected part) and the retention capacitor line 18. A liquid crystal capacitor (Cl1) is defined by the pixel electrode 17a and a common electrode com. A liquid crystal capacitor (Cl2) is defined by the pixel electrode 17b and the common electrode com.

In a case where a liquid crystal display device in which the liquid crystal panel of the present embodiment is used is driven by frame inversion driving, a signal electric potential Vs is written into the respective pixel electrodes 17a and 17b during a period in which the transistors 12a and 12b turn on. For example, in a case where (i) the signal electric potential Vs has a positive polarity and (ii) the transistor 112 turns on by scanning the scanning signal line 116 after the transistors 12a and 12b has turned off, the pixel electrode 17a and the coupling electrode CE are electrically connected, so that positive electric charge of the pixel electrode 17a moves to the coupling electrode CE (this is referred to as a discharge of positive electric charge). This decreases an electric potential of the pixel electrode 17a to be lower than the signal electric potential Vs, whereas this increases an electric potential of the pixel electrode 17b, with which the coupling electrode CE defines the coupling capacitor Cx, to be higher than the signal electric potential Vs in response to an increase in electric potential of the coupling electrode CE. Note that, in a case where (i) the signal electric potential Vs has a negative polarity and (ii) the transistor 112 turns on by scanning the scanning signal line 116 after the transistors 12a and 12b has turned off, the pixel electrode 17a and the coupling electrode CE are electrically connected, so that negative electric charge of the pixel electrode 17a moves to the coupling electrode CE (this is referred to as a discharge of negative electric charge). This increases the electric potential of the pixel electrode 17a to be higher than the signal electric potential Vs, whereas this decreases the electric potential of the pixel electrode 17b, with which the coupling electrode CE defines the coupling capacitor Cx, to be lower than the signal electric potential Vs in response to a decrease in electric potential of the coupling electrode CE.

Accordingly, in a case where the pixel electrode 17a has an electric potential va after the transistor 112 has turned off and the pixel electrode 17b has an electric potential vb after the transistor 112 has turned off, $|vb| \geq |va|$ (note that, for example, $|vb|$ refers to an electric potential difference between vb and a com electric potential=Vcom). Therefore, the halftone display can be carried out by area coverage modulation which is achieved by a pair of bright subpixel and dark subpixel. Here, a subpixel including the pixel electrode 17a is referred to as the bright subpixel, and a subpixel including the pixel electrode 17b is referred to as the dark subpixel. This allows an improvement in viewing angle characteristic of the liquid crystal display device in accordance with the present embodiment.

Figure 1:
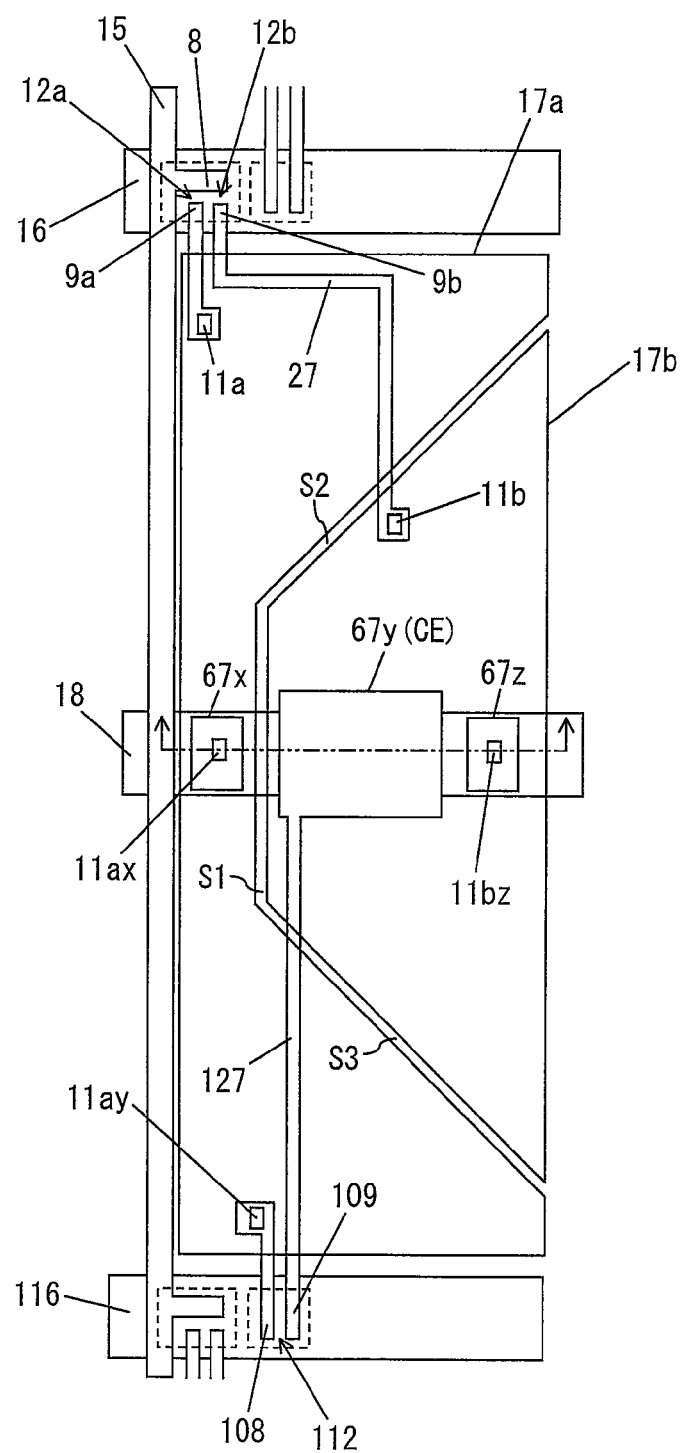
FIG. 1
FIG. 1 is a plan view illustrating a first arrangement example of a liquid crystal panel of the present invention.

FIG. 1 illustrates a specific example of the pixel 101 of FIG. 3. Note that FIG. 1 is easily viewable because it illustrates no member of a color filter substrate (a counter substrate) but only members of an active matrix substrate. In the pixel 101, there are provided the transistors 12a and 12b, the transistor 112, the pixel electrodes 17a and 17b, two capacitor electrodes (a first capacitor electrode 67x and a second capacitor electrode 67z), and a coupling electrode 67y (CE) (see FIG. 1). The transistors 12a and 12b are provided in a vicinity of an intersection of the data signal line 15 and the scanning signal line 16. The transistor 112 is provided in a vicinity of an intersection of the data signal line 15 and the scanning signal line 116. The pixel electrode 17b which is trapezoidally shaped when viewed in the row direction and the pixel electrode 17a which is shaped so as to fit the pixel electrode 17b, are aligned in the row direction in a pixel region defined by the data signal line 15 and the scanning signal line 16. The first and second capacitor electrodes 67x and 67z and the coupling electrode 67y (CE) are provided in a layer in which the data signal line 15 is provided. Note that the retention capacitor line 18 extends in the row direction so that the retention capacitor line 18 and the pixel electrodes 17a and 17b overlap one another.

Namely, the pixel electrode 17b has first through fourth sides. The first side intersects with the retention capacitor line 18 at substantially right angles. The second side extends from one end of the first side so as to be at an angle of approximately 45° with respect to the row direction. The third side extends from the other end of the first side so as to be at an angle of approximately 315° with respect to the row direction. The fourth side is parallel to the first side and intersects with the retention capacitor line 18. The pixel electrode 17b has a trapezoidal shape, and its first side and fourth side serve as an upper base and a lower base, respectively. A line defined by the medians of the first and fourth sides extend above the retention capacitor line 18.

The pixel electrode 17a has first through eighth sides. The fourth through sixth sides extend along the data signal line 15, the seventh side extends along the scanning signal line 16, and the eighth side extends along the scanning signal line 116. The first through third sides respectively face the first through third sides of the pixel electrode 17b. A first gap S1 is secured between the first side of the pixel electrode 17b and the first side of the pixel electrode 17a, a second gap S2 is secured between the second side of the pixel electrode 17b and the second side of the pixel electrode 17a, and a third gap S3 is secured between the third side of the pixel electrode 17b and the third side of the pixel electrode 17a.

Note here that (i) the first capacitor electrode 67x, the coupling electrode 67y, and the second capacitor electrode 67z are aligned in the row direction in this order so that each of them and the retention capacitor line 18 overlap each other via a gate insulating film (not illustrated), (ii) the first capacitor electrode 67x and the pixel electrode 17a overlap each other via an interlayer insulating film (not illustrated), and (iii) each of the coupling electrode 67y and the second capacitor electrode 67z and the pixel electrode 17b overlap each other via the interlayer insulating film (not illustrated). Namely, the coupling electrode 67y is provided in the center of the pixel, and (i) the first capacitor electrode 67x is provided between one (the data signal line 15) of two adjacent data signal lines and the coupling electrode 67y and (ii) the second capacitor electrode 67z is provided between the other of the two adjacent data signal lines and the coupling electrode 67y, when the pixel 101 is viewed from above.

The transistors 12a and 12b have a source electrode 8 (a common source electrode) which is connected to the data signal line 15. The transistor 12a has a drain electrode 9a which is connected to the pixel electrode 17a, via a contact hole 11a and a wire drawn out of drain. The transistor 12b has a drain electrode 9b which is connected to the pixel electrode 17b, via a contact hole 11b and a wire 27 drawn out of drain. The transistor 112 has a source electrode 108 which is connected to the pixel electrode 17a and a drain electrode 109 which is connected to the coupling electrode 67y via an electrode 127 drawn out of drain. This causes (i) the coupling capacitor Cx (see FIG. 3) to be defined by a part in which the coupling electrode 67y and the pixel electrode 17b overlap each other and (ii) the capacitor Cy (see FIG. 3) to be defined by a part in which the coupling electrode 67y and the retention capacitor line 18 overlap each other.

The first capacitor electrode 67x and the pixel electrode 17a are connected, via a contact hole 11ax, and the second capacitor electrode 67z and the pixel electrode 17b are connected, via a contact hole 11bz. This causes (i) much of the retention capacitor Ch1 to be defined by a part in which the first capacitor electrode 67x and the retention capacitor line 18 overlap each other and (ii) much of the retention capacitor Ch2 to be defined by a part in which the second capacitor electrode 67z and the retention capacitor line 18 overlap each other.

Figure 2:
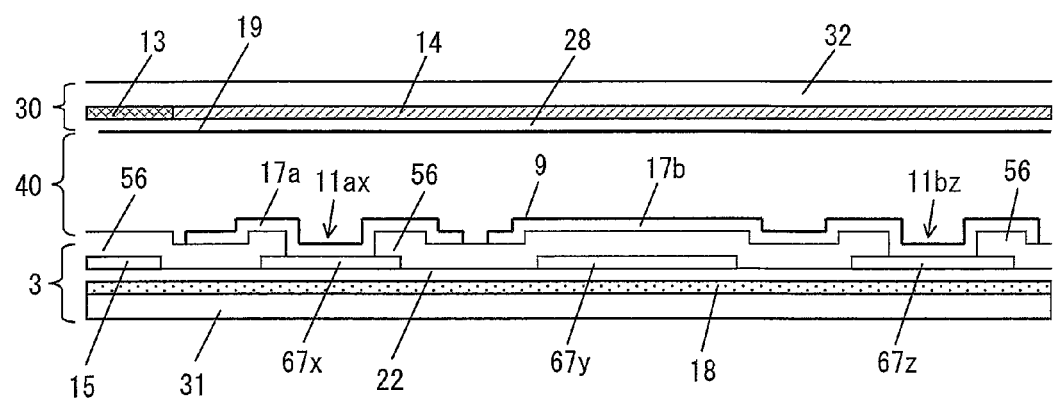
FIG. 2
FIG. 2 is a cross-sectional view, taken on the line indicated by arrows of the liquid crystal panel of FIG. 1.

FIG. 2 is a cross-sectional view, taken on the line indicated by arrows of FIG. 1. The liquid crystal panel of the present embodiment includes an active matrix substrate 3, a color filter substrate 30 which faces the active matrix substrate 3, and a liquid crystal layer 40 which is provided between the active matrix substrate 3 and the color filter substrate 30 (see FIG. 2). According to the active matrix substrate 3, the retention capacitor line 18 is provided on the glass substrate 31, and a gate insulating film 22 is provided so as to cover the glass substrate 31 and the retention capacitor line 18. Note that, though not illustrated in FIG. 2, the scanning signal lines 16 and 116 are provided on the glass substrate 31. A metal layer, in which the first capacitor electrode 67x, the coupling electrode 67y, the second capacitor electrode 67z, and the data signal line 15 are provided, is provided on the gate insulating film 22. Note that, though not illustrated in FIG. 2, the electrodes 27 and 127 drawn out of their respective drains, semiconductor layers (an i layer and an n+ layer), and the source electrodes 8 and 108 and the drain electrodes 9a, 9b, and 109 each of which is in contact with the n+ layer are provided on the gate insulating film 22. An interlayer insulating film 56 is provided so as to cover the metal layer. The pixel electrodes 17a and 17b are provided on the interlayer insulating film 56, and an alignment film 9 is provided so as to cover the pixel electrodes 17a and 17b. Note that the interlayer insulating film 56 is hollowed in the contact hole 11ax. This causes the connection between the pixel electrode 17a and the first capacitor electrode 67x. The interlayer insulating film 56 is hollowed in the contact hole 11bz. This causes the connection between the pixel electrode 17b and the second capacitor electrode 67z. The coupling electrode 67y and the pixel electrode 17b overlap each other, via the interlayer insulating film 56. This causes the coupling capacitor Cx to be defined (see FIG. 3). The first capacitor electrode 67x and the retention capacitor line 18 overlap each other, via the gate insulating film 22. This causes a part of the retention capacitor Ch1 to be defined (see FIG. 3). The second capacitor electrode 67z and the retention capacitor line 18 overlap each other, via the gate insulating film 22. This causes the retention capacitor Ch2 to be defined (see FIG. 3).

According to the color filter substrate 30, there are provided a glass substrate 32, a colored layer (a color filter layer) 14 which is provided on the glass substrate 32, a common electrode (com) 28 which is provided on the colored layer 14, and an alignment film 19 which is provided so as to cover the common electrode (com) 28.

Figure 4:
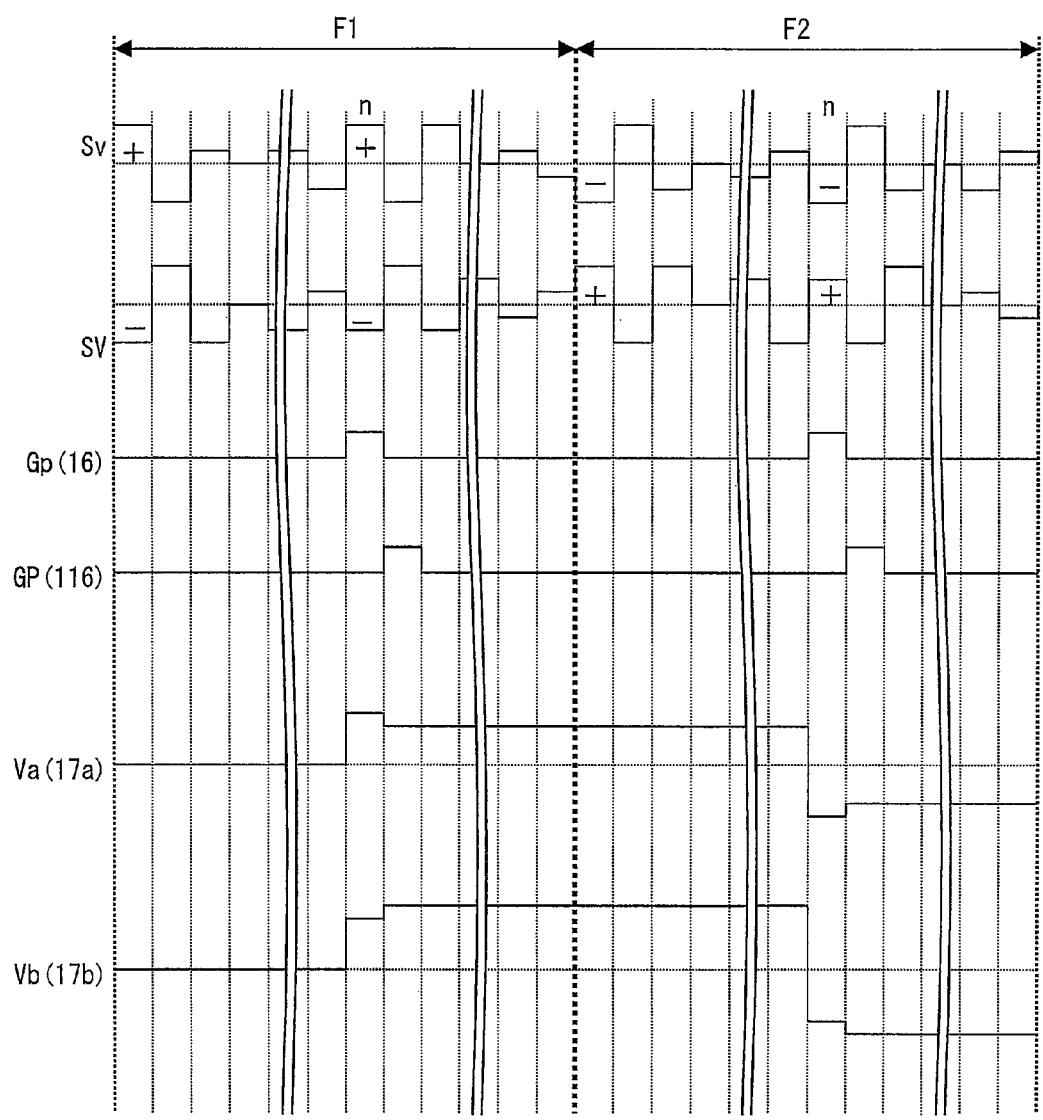
FIG. 4
FIG. 4 is a timing chart illustrating a method for driving a liquid crystal display device including the liquid crystal panel of FIG. 1.

FIG. 4 is a timing chart illustrating a method for driving the liquid crystal display device of the present invention (a normally black liquid crystal display device) including the liquid crystal panel illustrated in FIGS. 1 through 3. Note that Sv and SV show signal electric potentials which are supplied to the data signal line 15 and a data signal line adjacent to the data signal line 15, respectively, Gp and GP show gate-on pulse signals which are supplied to the scanning signal lines and 116, respectively, and Va and Vb show electric potentials of the pixel electrodes 17a and 17b, respectively.

According to the method, scanning signal lines are sequentially selected, so as to (i) inverse, for each horizontal scanning period (1H), polarities of signal electric potentials supplied to data signal lines, (ii) inverse, for each frame, polarities of signal electric potentials supplied during the same horizontal scanning period of each frame, and (iii) supply signal electric potentials having inverse polarities to respective two adjacent data signal lines during the same horizontal scanning period (see FIG. 4).

Specifically, scanning signal lines are sequentially selected during a frame F1 out of consecutive frames F1 and F2, and (i) a signal electric potential having a positive polarity is supplied to the data signal line 15 during an nth horizontal scanning period (containing a time period in which the scanning signal line 16 is scanned), (ii) a signal electric potential having a negative polarity is supplied to the data signal line 15 during an (n+1)th horizontal scanning period (containing a time period in which the scanning signal line 116 is scanned), (iii) a signal electric potential having a negative polarity is supplied to the data signal line adjacent to the data signal line 15 during the nth horizontal scanning period, and (iv) a signal electric potential having a positive polarity is supplied to the data signal line adjacent to the data signal line 15 during the (n+1)th horizontal scanning period. This causes $|Vb| \geq |Va|$ at the end of the (n+1)th horizontal scanning period (see FIG. 4). It follows that a subpixel including the pixel electrode 17a (having a positive polarity) is a dark subpixel, whereas a subpixel including the pixel electrode 17b (having a positive polarity) is a bright pixel.

During the frame F2, scanning signal lines are sequentially selected, and (i) a signal electric potential having a negative polarity is supplied to the data signal line 15 during an nth horizontal scanning period (containing a time period in which the scanning signal line 16 is scanned), (ii) a signal electric potential having a positive polarity is supplied to the data signal line 15 during an (n+1)th horizontal scanning period (containing a time period in which the scanning signal line 116 is scanned), (iii) a signal electric potential having a positive polarity is supplied to the data signal line adjacent to the data signal line 15 during the nth horizontal scanning period, and (iv) a signal electric potential having a negative polarity is supplied to the data signal line adjacent to the data signal line 15 during the (n+1)th horizontal scanning period. This causes $|Vb| \geq |Va|$ at the end of the (n+1)th horizontal scanning period (see FIG. 4). It follows that a subpixel including the pixel electrode 17a (having a negative polarity) is a dark subpixel, whereas a subpixel including the pixel electrode 17b (having a negative polarity) is a bright pixel.

Note that FIGS. 1 and 2 illustrate no alignment controlling structure of the color filter substrate. For example, according to an MVA (multi-domain vertical alignment) liquid crystal panel, an alignment controlling rib is provided in a color filter substrate and slits S1 through S3 serve as an alignment controlling structure. Note that an alignment controlling slit can be provided in a common electrode of the color filter substrate, instead of such a rib being provided in the color filter substrate.

According to the liquid crystal panel of FIG. 1, a first retention capacitor is defined by the part in which the first capacitor electrode 67x and the retention capacitor line 18 overlap each other only via the gate insulating film 22, and a second retention capacitor is defined by the part in which the second capacitor electrode 67z and the retention capacitor line 18 overlap each other only via the gate insulating film 22. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio.

Since the coupling electrode 67y is provided in the center of the pixel, it is possible to prevent the coupling electrode 67y and the data signal line from being short-circuited. Note that, in a case where the data signal line 15 and the first capacitor electrode 67x are short-circuited, it is possible to control the electric potentials of the respective pixel electrodes 17a and 17b (maintaining a halftone display by area coverage modulation), by trimming and removing the pixel electrode in the contact hole 11 ax with the use of laser or the like (see FIG. 5). Same applies to a case where the second capacitor electrode 67z and the data signal line adjacent to the data signal line 15 are short-circuited. Even if the coupling electrode 67y and the second capacitor electrode 67z are short-circuited or the first capacitor electrode 67x and the coupling electrode 67y are short-circuited, the pixel electrodes 17a and 17b have an identical electric potential at worst. As such, the electric potentials of the respective pixel electrodes 17a and 17b will never be beyond control.

The following description discusses a method for producing the liquid crystal panel of the present embodiment. A method for producing a liquid crystal panel includes the steps of (i) producing an active matrix substrate, (ii) producing a color filter substrate, and (iii) carrying out an assembly in which the liquid crystal is filled between combined active matrix substrate and color filter substrate.

First, (i) a metal film made of a material such as titanium, chromium, aluminum, molybdenum, tantalum, tungsten, or copper, (ii) an alloy film of such materials, or (iii) a film, in which (a) at least two metal films each made of the material are stacked, (b) at least two alloy films each made of the materials, or (c) at least one metal film made of the material and at least one alloy film made of the materials are stacked, is deposited on a substrate made of a material such as glass or plastic by a sputtering method so as to have a thickness of 1000 Å to 3000 Å. Thereafter, the film (i), (ii), or (iii) thus deposited is patterned by a photolithographic technique (Photo Engraving Process, hereinafter referred to as a "PEP technique"). This causes formations of scanning signal lines, gate electrodes of respective transistors (scanning signal lines may also serve as gate electrodes), and retention capacitor lines.

Next, an inorganic insulating film which is made of silicon nitride, oxide silicon, or the like and has a thickness of approximately 3000 Å to 5000 Å is deposited by a CVD (Chemical Vapor Deposition) method. This causes a formation of a gate insulating film throughout the substrate on which the scanning signal lines etc. have been formed.

Then, (i) an intrinsic amorphous silicon film which has a thickness of 1000 Å to 3000 Å and (ii) an n+ amorphous silicon film, having a thickness of 400 Å to 700 Å, to which phosphorous is added are sequentially deposited on the gate insulating film (the entire substrate) by the CVD method. Thereafter, the intrinsic amorphous silicon film and the n+ amorphous silicon film are patterned by the PEP technique, so that a silicon stacked layer in which an intrinsic amorphous silicon layer and an n+ amorphous silicon layer are stacked is island-shaped on the gate electrodes.

Subsequently, throughout the substrate on which the silicon stacked layer has been formed, (i) a metal film made of a material such as titanium, chromium, aluminum, molybdenum, tantalum, tungsten, or copper, (ii) an alloy film of such materials, or (iii) a film, in which (a) at least two metal films each made of the material are stacked, (b) at least two alloy films each made of the materials, or (c) at least one metal film made of the material and at least one alloy film made of the materials are stacked, is deposited on a substrate made of a material such as glass or plastic by the sputtering method so as to have a thickness of 1000 Å to 3000 Å. Thereafter, such a film is patterned by the "PEP technique". This causes formations of data signal lines, source electrodes and drain electrodes of the respective transistors, drain drawing wires, coupling capacitors, and capacitor electrodes (a formation of a metal layer).

While causing the source electrodes and the drain electrodes to serve as a mask, the n+ amorphous silicon layer constituting the silicon stacked layer is removed by etching so that channels of the respective transistors are formed. Note here that a semiconductor layer can be formed by an amorphous silicon film as described earlier or by a polysilicon film. Alternatively, a laser annealing treatment can be carried out with respect to an amorphous silicon film or a polysilicon film so that the semiconductor layer can have a better crystallinity. Since this causes an increase in mobility of electrons in the semiconductor layer, transistor (TFT) characteristic can be improved.

Next, an interlayer insulating film is deposited throughout the substrate on which the data signal lines etc. have been formed. Specifically, an inorganic interlayer insulating film (a passivation film), which has a thickness of approximately 3000 Å and is made of SiNx, is deposited by the CVD method by use of a mixed gas of $SiH_4$ gas, $NH_3$ gas, and $N_2$ gas so as to cover the entire substrate. An organic interlayer insulating film, which has a thickness of approximately 3 μm and is made of positive photosensitive acrylic resin, is further deposited by a spin coat method or a die coat method, if necessary.

Then, the interlayer insulating film is removed by etching with the use of the PEP technique so as to form contact holes. Subsequently, a transparent electroconductive film, which is made of a material such as ITO (Indium Tin Oxide), IZO (Indium Zinc Oxide), zinc oxide, or tin oxide and has a thickness of 1000 Å to 2000 Å, is deposited by the sputtering method throughout the substrate above the interlayer insulating film having the contact holes. Thereafter, the transparent electroconductive film is patterned by the PEP technique, so as to form pixel electrodes.

Finally, polyimide resin is printed throughout the substrate above the pixel electrodes so as to have a thickness of 500 Å to 1000 Å. Thereafter, the polyimide resin is sintered and then rubbed by use of a rotating cloth in one direction, so as to form an alignment film. The active matrix substrate is thus produced.

The following description discusses the step of producing a color filter substrate.

First, a chromium thin film or a resin film containing a black pigment is deposited on a substrate made of a material such as glass or plastic (on the entire substrate), and is then patterned by the PEP technique so as to form a black matrix. Next, red, green, and blue color filter layers (which have a thickness of approximately 2 μm) are patterned in gaps on the black matrix by use of a pigment dispersion method or the like.

Subsequently, a transparent electroconductive film, which is made of a material such as ITO, IZO, zinc oxide, tin oxide, or the like and has a thickness of approximately 1000 Å, is deposited throughout the substrate above the color filter layers so as to form a common electrode (com).

Finally, polyimide resin is printed throughout the substrate above the common electrode so as to have a thickness of 500 Å to 1000 Å. Thereafter, the polyimide resin is sintered and then rubbed by use of a rotating cloth in one direction, so as to form an alignment film. The color filter substrate can thus be produced.

The following description discusses the step of carrying out the assembly.

First, a sealing material made of a material such as a thermosetting epoxy resin is applied, by screen printing, to one of the active matrix substrate and the color filter substrate in a frame-shaped pattern such that no sealing material is applied to a part in which a liquid crystal filling opening is provided. Then, spherical spacers, which have a diameter equivalent to a thickness of a liquid crystal layer and are made of plastic or silica, are dispersed on the other of the active matrix substrate and the color filter substrate.

Next, the active matrix substrate and the color filter substrate are combined, and then the sealing material is cured.

Finally, a liquid crystal material is filled, via a liquid crystal filling opening, into a space defined by the active matrix substrate, the color filter substrate, and the sealing material by a decompression method. Then, UV-cured resin is applied to the liquid crystal filling opening so as to seal the liquid crystal material by UV irradiation. This causes the liquid crystal layer to be formed. The liquid crystal panel is thus produced.

Refer to FIG. 2 again. The interlayer insulating film 56 (a channel protection film) of FIG. 2 can have a structure in which an inorganic interlayer insulating film 25 and an organic interlayer insulating film 26 which is thicker than the inorganic interlayer insulating film 25 are stacked (see FIGS. 6 and 7). This brings about effects of (i) a reduction in parasitic capacitances, (ii) prevention of wires from being short-circuited, and (iii) a reduction in occurrences of a crack in a pixel electrode due to flattening of the interlayer insulating film 56. In this case, it is preferable to beforehand hollow, in the organic interlayer insulating film 26, a rectangular region Jky containing a part in which the organic interlayer insulating film 26 and the coupling electrode 67y overlap each other (see FIGS. 6 and 7). This brings about the effects (i) through (iii) while sufficiently securing a capacitance of the coupling capacitor Cx (see FIG. 3).

Figure 7:
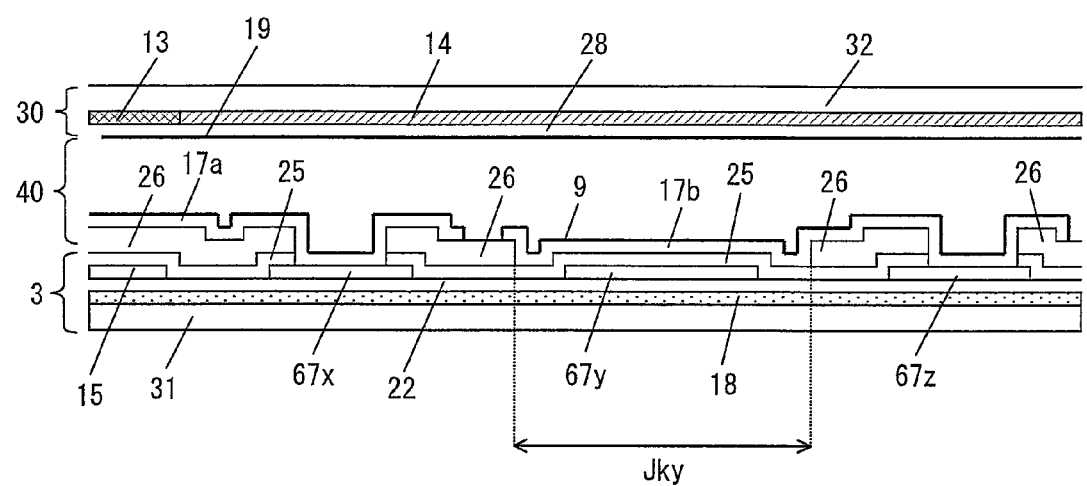
FIG. 7
FIG. 7 is a cross-sectional view, taken on the line indicated by arrows of the liquid crystal panel of FIG. 6.
Figure 8:
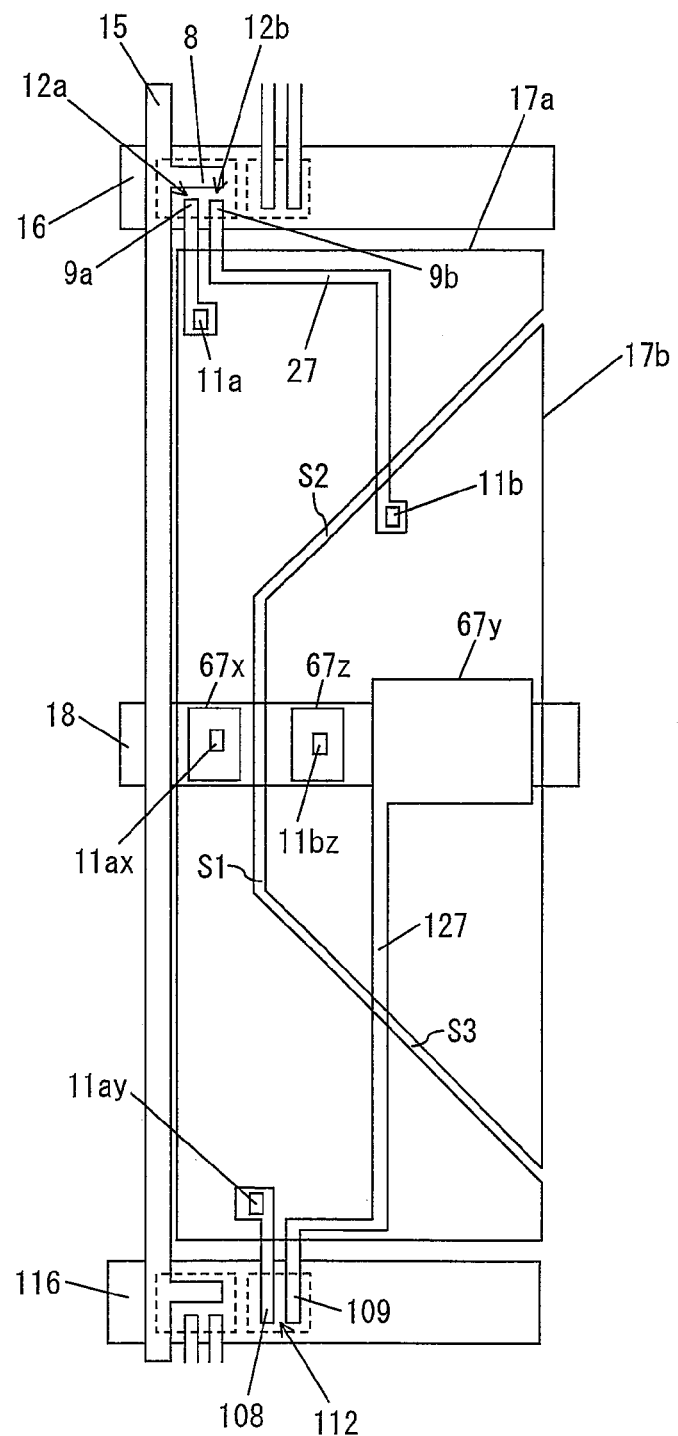
FIG. 8
FIG. 8 is a plan view illustrating another modification of the liquid crystal panel illustrated in FIG. 1.
Figure 9:
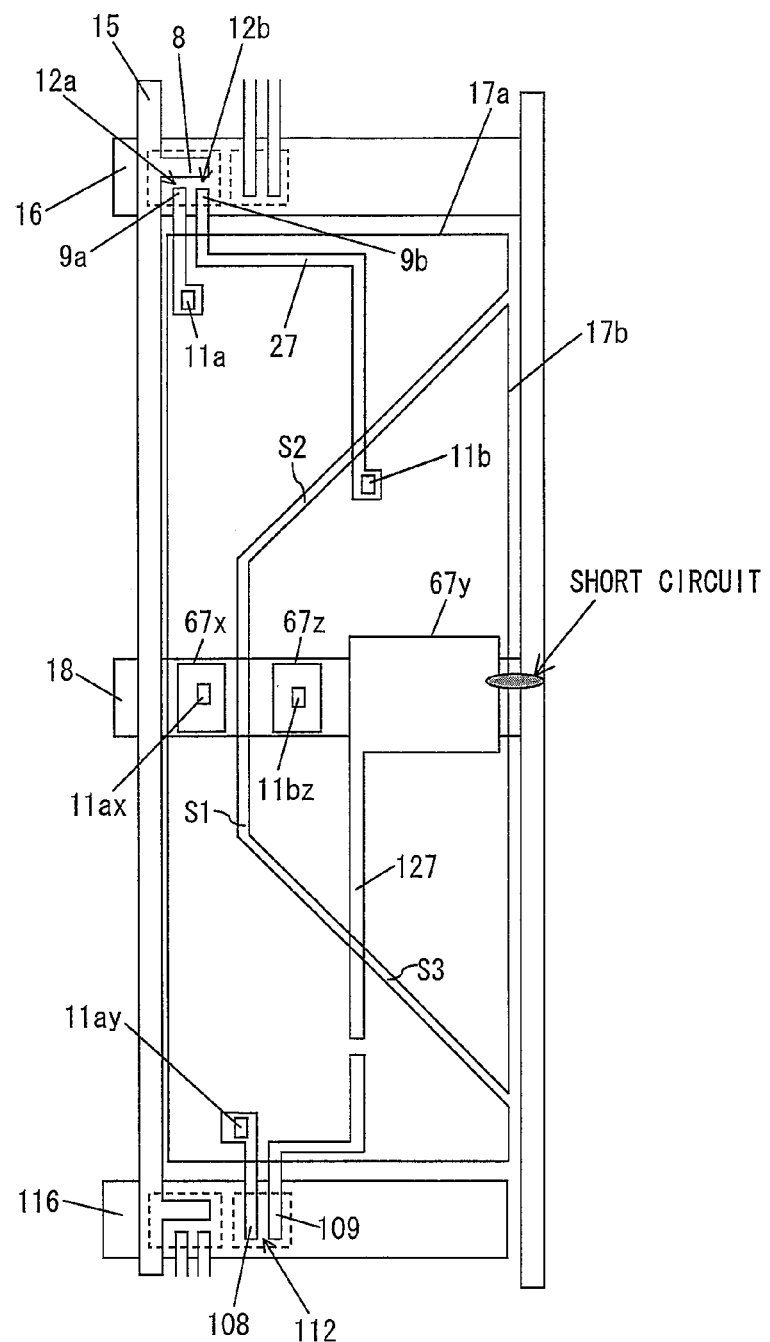
FIG. 9
FIG. 9 is a plan view illustrating a method for correcting the liquid crystal panel of FIG. 8.

The following description discusses an example of how to deposit the inorganic interlayer insulating film 25 and the organic interlayer insulating film 26 of FIG. 7, and the contact holes 11ax and 11bz. Namely, after the transistors and the data signal lines have been deposited, the insulating film inorganic layers 25 (passivation film), which has a thickness of approximately 3000 Å and is made of SiNx, is deposited by the CVD method by use of a mixed gas of $SiH_4$ gas, $NH_3$ gas, and $N_2$ gas so as to cover the entire substrate. Thereafter, the organic interlayer insulating film 26, which has a thickness of approximately 3 μm and is made of positive photosensitive acrylic resin, is deposited by the spin coat method or the die coat method. Subsequently, photolithography is carried out to form the hollowed part in the organic interlayer insulating film 26 and patterns of various contact holes. Then, while causing the organic interlayer insulating film 26 to serve as a mask, the inorganic interlayer insulating film 25 is dry-etched by use of a mixed gas of $CF_4$ gas and $O_2$ gas. Specifically, for example, the hollowed part in the organic interlayer insulating film is subjected to half-exposure in the photolithography process so as to cause the organic interlayer insulating film to remain thin at the end of a developing process, whereas the contact hole parts are subjected to full-exposure in the photolithography process so as to cause the organic interlayer insulating film not to remain at the end of the developing process. Note here that, in a case where the dry etching is carried out with respect to the inorganic interlayer insulating film by use of the mixed gas of $CF_4$ gas and $O_2$ gas, (i) the remaining film (of the organic interlayer insulating film) is removed from the hollowed part in the organic interlayer insulating film and (ii) the inorganic interlayer insulating film which is provided under the organic interlayer insulating film is removed from the contact hole parts. Note that the organic interlayer insulating film 26 can be made of an SOG (spin-on glass) material, for example. Note also that the organic interlayer insulating film 26 can contain at least one of acrylic resin, epoxy resin, polyimide resin, polyurethane resin, novolac resin, and siloxane resin.

An arrangement of the first capacitor electrode 67x, the coupling electrode 67y, and the second capacitor electrode 67z is not limited to the arrangement illustrated in FIGS. 1 and 2 such that the first capacitor electrode 67x, the coupling electrode 67y, and the second capacitor electrode 67z are aligned in the row direction in this order. For example, an effect of an increase in pixel aperture ratio can be obtained even in an arrangement of FIG. 8 in which the first capacitor electrode 67x, the second capacitor electrode 67z, and the coupling electrode 67y are aligned in this order. In a case where the coupling electrode 67y and the data signal line adjacent to the data signal line 15 are short-circuited in the arrangement of FIG. 8, it is only necessary to cut the electrode 127 by laser or the like (see FIG. 9). This causes the pixel electrodes 17a and 17b to have an identical electric potential at worst. As such, the electric potentials of the respective pixel electrodes 17a and 17b will never be beyond control. This also causes the pixel electrodes 17a and 17b to continue to have their respective normal retention capacitances.

Figure 10:
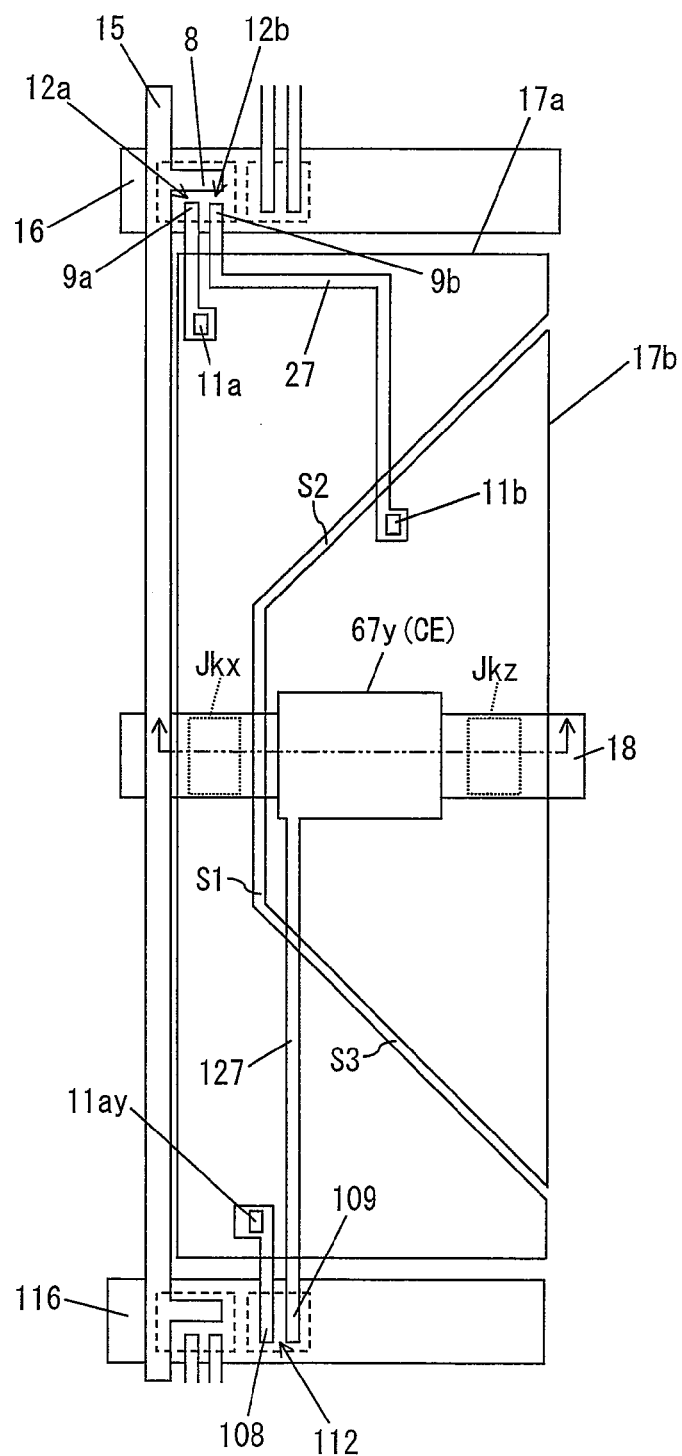
FIG. 10
FIG. 10 is a plan view illustrating a second arrangement example of the liquid crystal panel of the present invention.
Figure 11:
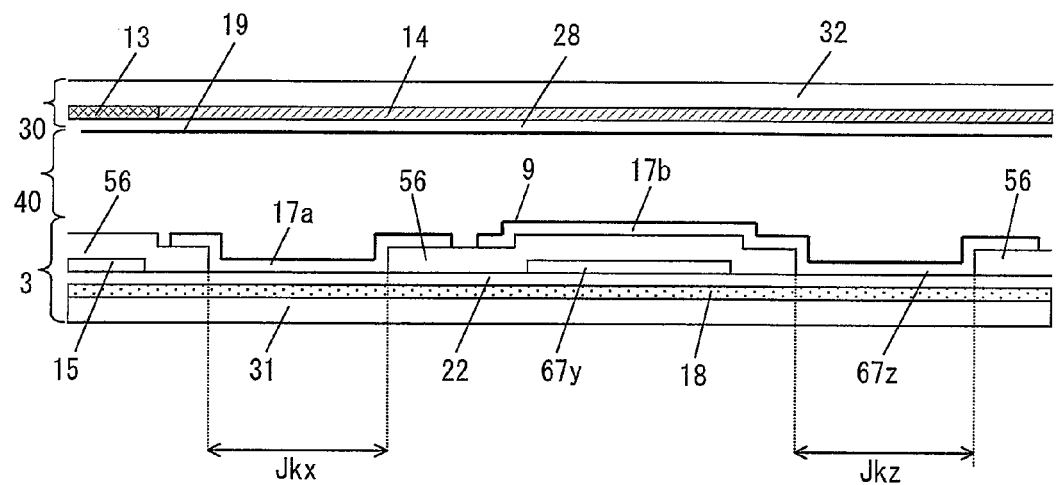
FIG. 11
FIG. 11 is an example of a cross-sectional view, taken on the line indicated by arrows of the liquid crystal panel illustrated in FIG. 10.
Figure 12:
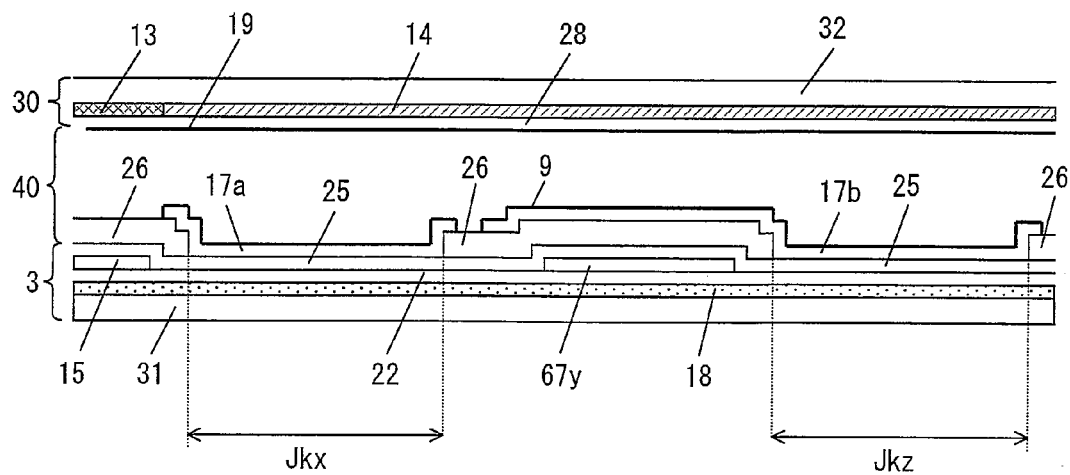
FIG. 12
FIG. 12 is another example of the cross-sectional view, taken on the line indicated by arrows of the liquid crystal panel illustrated in FIG. 10.
Figure 15:
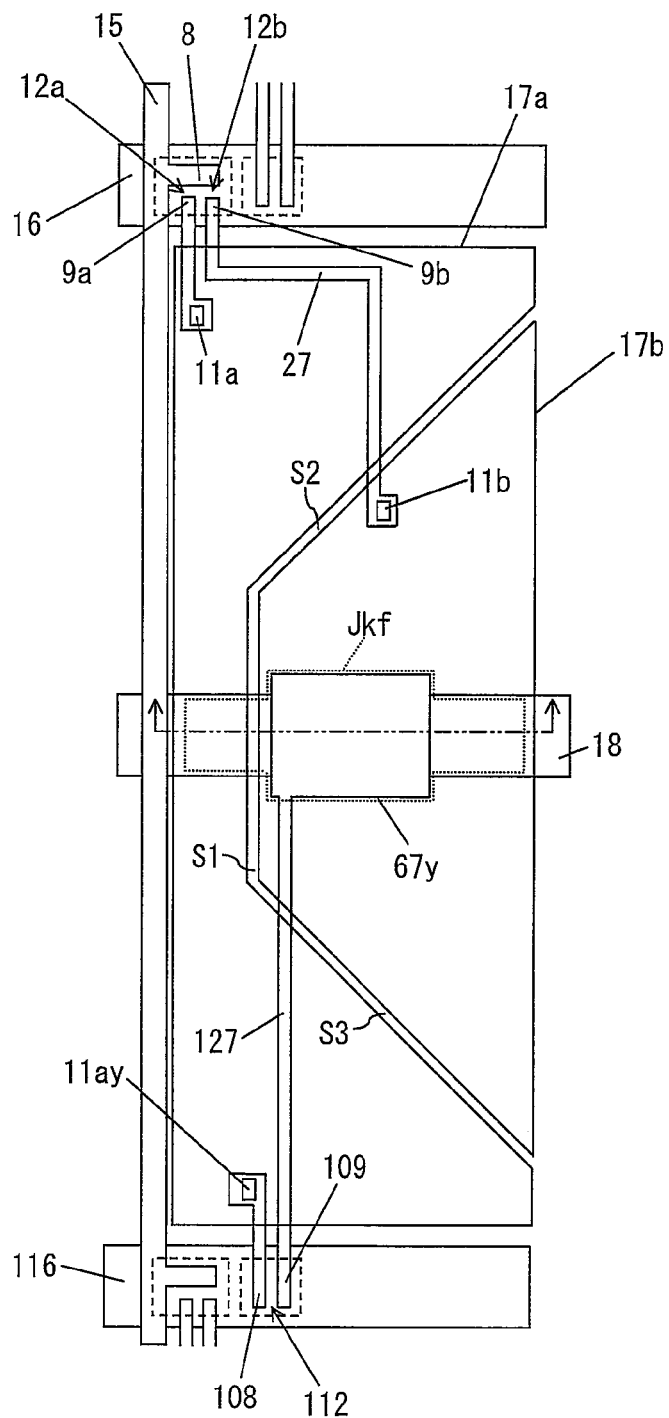
FIG. 15
FIG. 15 is a plan view illustrating a modification of the liquid crystal panel of FIG. 13.

FIG. 10 illustrates a second specific example of the pixel 101 (see FIG. 3), and FIGS. 11 and 12 are cross-sectional views of FIG. 10, taken on the line indicated by arrows. Note that FIG. 10 is easily viewable because it illustrates no member of the color filter substrate (the counter substrate) but only members of the active matrix substrate. In the pixel 101, there are provided the transistors 12a and 12b, the transistor 112, the pixel electrodes 17a and 17b, and the coupling electrode 67y (CE) (see FIG. 10). The transistors 12a and 12b are provided in the vicinity of the intersection of the data signal line 15 and the scanning signal line 16. The transistor 112 is provided in the vicinity of the intersection of the data signal line 15 and the scanning signal line 116. The pixel electrode 17b which is trapezoidally shaped when viewed in the row direction and the pixel electrode 17a which is shaped so as to fit the pixel electrode 17b, are aligned in the row direction in the pixel region defined by the data signal line 15 and the scanning signal line 16. The coupling electrode 67y (CE) is provided in the layer in which the data signal line 15 is provided. Note that the retention capacitor line 18 extends in the row direction so that the retention capacitor line 18 and the pixel electrodes 17a and 17b overlap one another.

Specifically, FIG. 10 is identical to FIG. 1 in shapes of the respective pixel electrodes 17a and 17b, and the coupling electrode 67y is provided in the center of the pixel so that (i) the coupling electrode 67y and (ii) each of the pixel electrode 17b and the retention capacitor line 18 overlap one another. The transistors 12a and 12b have the source electrode 8 (the common source electrode) which is connected to the data signal line 15. The transistor 12a has the drain electrode 9a which is connected to the pixel electrode 17a, via the contact hole 11a and the wire drawn out of drain. The transistor 12b has the drain electrode 9b which is connected to the pixel electrode 17b, via the contact hole 11b and the wire 27 drawn out of drain. The transistor 112 has the source electrode 108 which is connected to the pixel electrode 17a and the drain electrode 109 which is connected to the coupling electrode 67y via the electrode 127 drawn out of drain. This causes the coupling capacitor Cx (see FIG. 3) to be defined by the part in which the coupling electrode 67y and the pixel electrode 17b overlap each other.

The coupling electrode 67y and the pixel electrode 17b overlap each other, via the interlayer insulating film which serves as the channel protection film. The interlayer insulating film should be (i) hollowed in a rectangular region Jkx (a) which is located between the coupling electrode 67y and the data signal line 15, when it is viewed from above and (b) in which the interlayer insulating film, the pixel electrode 17a, and the retention capacitor line 18 overlap each other (see FIG. 11) or (ii) formed thinner in the rectangular region Jkx than in a region surrounding the rectangular region Jkx (see FIG. 12). The interlayer insulating film should also be (i) hollowed in a rectangular region Jkz (a) which is located between the coupling electrode 67*y* and the data signal line adjacent to the data signal line 15, when it is viewed from above and (b) in which the interlayer insulating film, the pixel electrode 17*b*, and the retention capacitor line 18 overlap each other (see FIG. 11) or (ii) formed thinner in the rectangular region Jkz than in a region surrounding the rectangular region Jkz (see FIG. 12).

Namely, according to the active matrix substrate 3 of FIG. 11, the retention capacitor line 18 is provided on the glass substrate 31, and the gate insulating film 22 is provided so as to cover the glass substrate 31 and the retention capacitor line 18. Note that, though not illustrated in FIG. 11, the scanning signal lines 16 and 116 are provided on the glass substrate 31. The metal layer, in which the coupling electrode 67*y* and the data signal line 15 are provided, is provided on the gate insulating film 22. Note that, though not illustrated in FIG. 11, the electrodes 27 and 127 drawn out of their respective drains, the semiconductor layers (the i layer and the n+ layer), and the source electrodes 8 and 108 and the drain electrodes 9*a*, 9*b*, and 109 each of which is in contact with the n+ layer are provided on the gate insulating film 22. The interlayer insulating film 56 is provided so as to cover the metal layer. The pixel electrodes 17*a* and 17*b* are provided on the interlayer insulating film 56, and the alignment film 9 is provided so as to cover the pixel electrodes 17*a* and 17*b*. The coupling electrode 67*y* and the pixel electrode 17*b* overlap each other, via the interlayer insulating film 56. This causes the coupling capacitor Cx to be defined (see FIG. 3).

Note here that the interlayer insulating film 56 should be hollowed in the following two regions: (i) the rectangular region Jkx (a) which is located between the coupling electrode 67*y* and the data signal line 15, when it is viewed from above and (b) in which the interlayer insulating film 56, the retention capacitor line 18, and the pixel electrode 17*a* overlap each other and (ii) the rectangular region Jkz (a) which is located between the coupling electrode 67*y* and the data signal line adjacent to the data signal line 15, when it is viewed from above and (b) in which the interlayer insulating film 56, the retention capacitor line 18, and the pixel electrode 17*b* overlap each other. This causes (i) much of the retention capacitor Ch1 (see FIG. 3) to be defined by the part in which the retention capacitor line 18 located below the rectangular region Jkx and the pixel electrode 17*a* located above the rectangular region Jkx overlap each other only via the gate insulating film 22 and (ii) much of the retention capacitor Ch2 (see FIG. 3) to be defined by the part in which part the retention capacitor line located below the rectangular region Jkz and the pixel electrode 17*b* located above the rectangular region Jkz overlap each other only via the gate insulating film 22.

According to the active matrix substrate 3 of FIG. 12, the inorganic interlayer insulating film 25 is provided so as to cover the metal layer, the organic interlayer insulating film 26, which is thicker than the inorganic interlayer insulating film 25, is provided on the inorganic interlayer insulating film 25, and the pixel electrodes 17*a* and 17*b* are provided on the organic interlayer insulating film 26. The coupling electrode 67*y* and the pixel electrode 17*b* overlap each other, via the inorganic interlayer insulating film 25 and the organic interlayer insulating film 26. This causes the retention capacitor Cx (see FIG. 3) to be defined. Note here that the organic interlayer insulating film 26 should be hollowed in the following two regions: (i) the rectangular region Jkx (a) which is located between the coupling electrode 67*y* and the data signal line 15, when it is viewed from above and (b) in which the organic interlayer insulating film 26, the retention capacitor line 18, and the pixel electrode 17*a* overlap each other and (ii) the rectangular region Jkz (a) which is located between the coupling electrode 67*y* and the data signal line adjacent to the data signal line 15, when it is viewed from above and (b) in which the organic interlayer insulating film 26, the retention capacitor line 18, and the pixel electrode 17*b* overlap each other. This causes (i) much of the retention capacitor Ch1 (see FIG. 3) to be defined by the part in which the retention capacitor line 18 located below the rectangular region Jkx and the pixel electrode 17*a* located above the rectangular region Jkx overlap each other only via the gate insulating film 22 and the inorganic interlayer insulating film 25 and (ii) much of the retention capacitor Ch2 (see FIG. 3) to be defined by the part in which the retention capacitor line 18 located below the rectangular region Jkz and the pixel electrode 17*b* located above the rectangular region Jkz overlap each other only via the gate insulating film 22 and the inorganic interlayer insulating film 25.

According to the liquid crystal panel illustrated in FIGS. 10 and 11, the first retention capacitor is defined by the part in which the pixel electrode 17*a* and the retention capacitor line 18 overlap each other only via the gate insulating film 22, and the second retention capacitor is defined by the part in which the pixel electrode 17*b* and the retention capacitor line 18 overlap each other only via the gate insulating film 22. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio. According to the liquid crystal panel illustrated in FIGS. 10 and 12, the first retention capacitor is defined by the part in which the pixel electrode 17*a* and the retention capacitor line 18 overlap each other only via the gate insulating film 22 and the inorganic interlayer insulating film 25, and the second retention capacitor is defined by the part in which the pixel electrode 17*b* and the retention capacitor line 18 overlap each other only via the gate insulating film 22 and the inorganic interlayer insulating film 25. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio.

The coupling electrode 67*y* is provided in the center of the pixel, and a distance between the coupling electrode 67*y* and the respective data signal lines is maintained. This can prevent the coupling electrode 67*y* and the respective data signal lines from being short-circuited.

Figure 5:
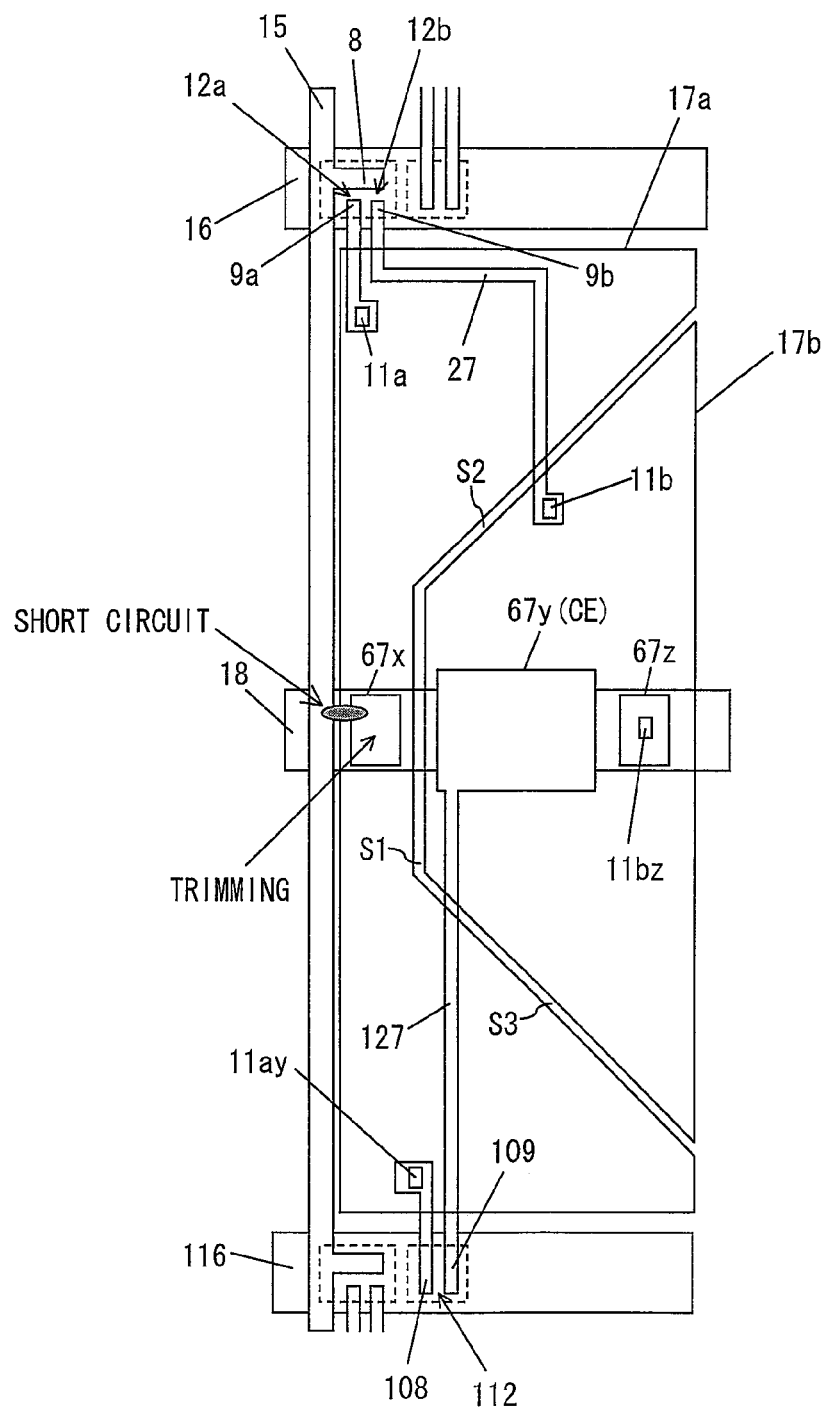
FIG. 5
FIG. 5 is a plan view illustrating a method for correcting the liquid crystal panel of FIG. 1.
Figure 6:
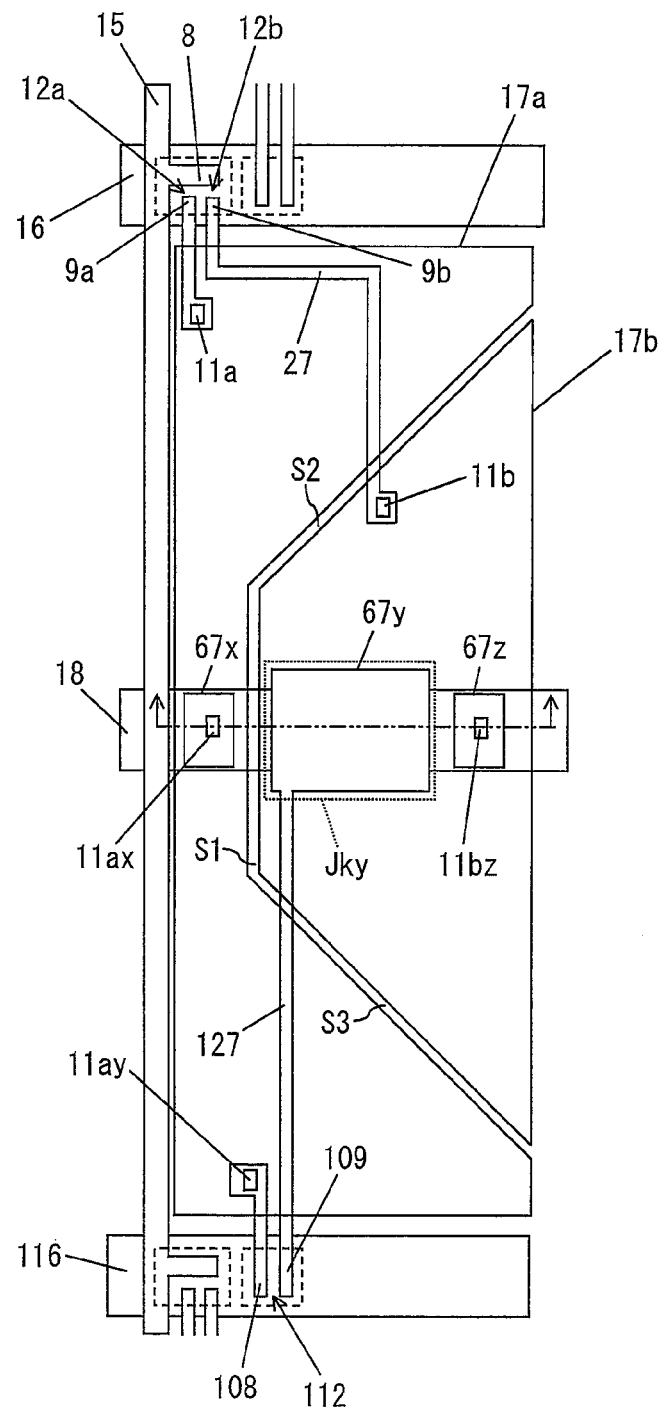
FIG. 6
FIG. 6 is a plan view illustrating a modification of the liquid crystal panel of FIG. 1.

The liquid crystal panel illustrated in FIGS. 10 and 11 has an advantage of preventing short-circuiting as illustrated in FIG. 5 (preventing a data signal line and a capacitor electrode from being short-circuited). This is because the liquid crystal panel does not need to be provided with a capacitor electrode (an electrode for maintaining a retention capacitance) as illustrated in FIG. 1.

It is preferable that the organic interlayer insulating film 26 of the liquid crystal panel illustrated in FIGS. 10 and 12 be hollowed also in the rectangular region Jky in which the organic interlayer insulating film 26 and the coupling electrode 67y overlap each other (see FIGS. 13 and 14). This brings about the aforementioned effects while sufficiently securing a capacitance of the coupling capacitor Cx (see FIG. 3). Note that the arrangements illustrated in FIGS. 13 and 14 can be modified to arrangements illustrated in FIGS. 15 and 16, respectively. Namely, the inorganic interlayer insulating film 26 can be hollowed in a crisscross region Jkf which covers the following three regions: (i) the region (a) which is located between the coupling electrode 67y and the data signal line 15 and (b) in which the inorganic interlayer insulating film 26, the retention capacitor line 18, and the pixel electrode 17a overlap one another, (ii) the region (a) which is located between the coupling electrode 67y and the data signal line adjacent to the data signal line 15 and (b) in which the inorganic interlayer insulating film 26, the retention capacitor line 18, and the pixel electrode 17b overlap one another, and (iii) the region in which the inorganic interlayer insulating film 26 and the coupling electrode 67y overlap each other.

Figure 18:
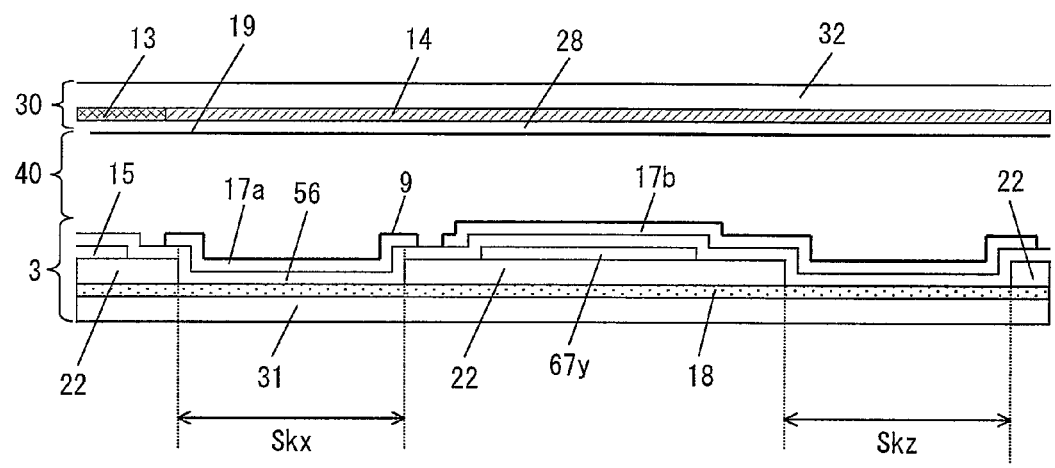
FIG. 18
FIG. 18 is an example of a cross-sectional view, taken on the line indicated by arrows of the liquid crystal panel illustrated in FIG. 17.
Figure 19:
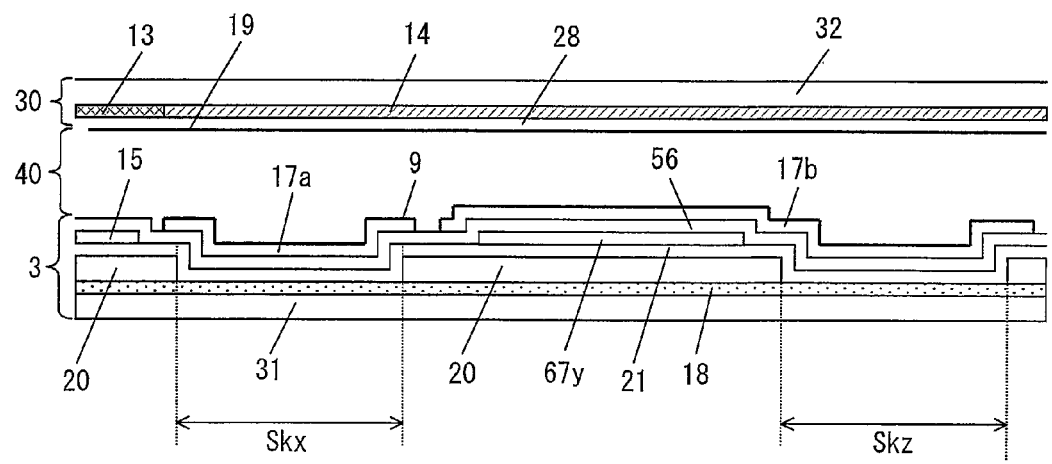
FIG. 19
FIG. 19 is another example of the cross-sectional view, taken on the line indicated by arrows of the liquid crystal panel illustrated in FIG. 17.

FIG. 17 illustrates a third specific example of the pixel 101 (see FIG. 3), and FIGS. 18 and 19 are cross-sectional view of FIG. 17, taken on the line indicated by arrows. Note that FIG. 17 is identical to FIG. 10 in (i) shapes of the respective pixel electrodes 17a and 17b, (ii) how to provide the retention capacitor line 18, and (iii) how the pixel electrodes 17a and 17b are connected to the respective transistors. The coupling electrode 67y is provided in the center of the pixel so that (i) the coupling electrode 67y and (ii) each of the pixel electrode 17b and the retention capacitor line 18 overlap one another.

The coupling electrode 67y and the pixel electrode 17b overlap each other, via the interlayer insulating film which serves as the channel protection film. The coupling electrode 67y and the retention capacitor line 18 overlap each other, via the gate insulating film. The gate insulating film should be hollowed in a rectangular region Skx (a) which is located between the coupling electrode 67y and the data signal line 15, when it is viewed from above and (b) in which the gate insulating film, the pixel electrode 17a, and the retention capacitor line 18 overlap each other (see FIG. 18) or (ii) formed thinner in the rectangular region Skx than in a region surrounding the rectangular region Skx (see FIG. 19). The gate insulating film should also be hollowed in a rectangular region Skz (a) which is located between the coupling electrode 67y and the data signal line adjacent to the data signal line 15, when it is viewed from above and (b) in which the gate insulating film, the pixel electrode 17b, and the retention capacitor line 18 overlap each other (see FIG. 18) or (ii) formed thinner in the rectangular region Skz than in a region surrounding the rectangular region Skz (see FIG. 19).

Namely, according to the active matrix substrate 3 of FIG. 18, the retention capacitor line 18 is provided on the glass substrate 31, and the gate insulating film 22 is provided so as to cover the glass substrate 31 and the retention capacitor line 18. The interlayer insulating film 56 is provided so as to cover the metal layer in which the coupling electrode 67y and the data signal line 15 are provided, and the pixel electrodes 17a and 17b are provided on the interlayer insulating film 56. The coupling electrode 67y and the pixel electrode 17b overlap each other, via the interlayer insulating film 56. This causes the retention capacitor Cx (see FIG. 3) to be defined. Note here that the gate insulating film 22 should be hollowed the following two regions: (i) the rectangular region Skx (a) which is located between the coupling electrode 67y and the data signal line 15, when it is viewed from above and (b) in which the gate insulating film 22, the retention capacitor line 18, and the pixel electrode 17a overlap each other and (ii) the rectangular region Skz (a) which is located between the coupling electrode 67y and the data signal line adjacent to the data signal line 15, when it is viewed from above and (b) in which the gate insulating film 22, the retention capacitor line 18, and the pixel electrode 17b overlap each other. This causes (i) much of the retention capacitor Ch1 (see FIG. 3) to be defined by the part in which the retention capacitor line 18 located below the rectangular region Skx and the pixel electrode 17a located above the rectangular region Skx overlap each other only via the interlayer insulating film 56 and (ii) much of the retention capacitor Ch2 (see FIG. 3) to be defined by the part in which the retention capacitor line 18 located below the rectangular region Skz and the pixel electrode 17b located above the rectangular region Skz overlap each other only via the interlayer insulating film 56.

In the active matrix substrate 3 of FIG. 19, an organic gate insulating film 20 is provided so as to cover the retention capacitor line 18, an inorganic gate insulating film 21, which is thinner than the organic gate insulating film 20, is provided on the organic gate insulating film 20, and the metal layer, in which the coupling electrode 67y and the data signal line 15 are provided, is provided on the inorganic gate insulating film 21. The coupling electrode 67y and the pixel electrode 17b overlap each other, via the interlayer insulating film 56. This causes the retention capacitor Cx (see FIG. 3) to be defined. Note here that the organic gate insulating film 21 should be hollowed the following two regions: (i) the rectangular region Skx (a) which is located between the coupling electrode 67y and the data signal line 15, when it is viewed from above and (b) in which the organic gate insulating film 21, the retention capacitor line 18, and the pixel electrode 17a overlap each other and (ii) the rectangular region Skz (a) which is located between the coupling electrode 67y and the data signal line adjacent to the data signal line 15, when it is viewed from above and (b) in which the organic gate insulating film 21, the retention capacitor line 18, and the pixel electrode 17b overlap each other. This causes (i) much of the retention capacitor Ch1 (see FIG. 3) to be defined by the part in which the retention capacitor line 18 located below the rectangular region Skx and the pixel electrode 17a located above the rectangular region Skx overlap each other only via the inorganic gate insulating film 21 and the interlayer insulating film 56 and (ii) much of the retention capacitor Ch2 (see FIG. 3) to be defined by the part in which the retention capacitor line 18 located below the rectangular region Skz and the pixel electrode 17b located above the rectangular region Skz overlap each other only via the inorganic gate insulating film 21 and the interlayer insulating film 56.

According to the liquid crystal panel illustrated in FIGS. 17 and 18, the first retention capacitor is defined by the part in which the pixel electrode 17a and the retention capacitor line 18 overlap each other only via the interlayer insulating film 56, and the second retention capacitor is defined by the part in which the pixel electrode 17b and the retention capacitor line 18 overlap each other only via the interlayer insulating film 56. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio. According to the liquid crystal panel illustrated in FIGS. 17 and 19, the first retention capacitor is defined by the part in which the pixel electrode 17a and the retention capacitor line 18 overlap each other only via the inorganic gate insulating film 21 and the interlayer insulating film 56, and the second retention capacitor is defined by the part in which the pixel electrode 17b and the retention capacitor line 18 overlap each other only via the inorganic gate insulating film 21 and the interlayer insulating film 56. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio.

The coupling electrode 67y is provided in the center of the pixel, and a distance between the coupling electrode 67y and the respective data signal lines is maintained. This can prevent the coupling electrode 67y and the respective data signal lines from being short-circuited.

The liquid crystal panel illustrated in FIGS. 17 through 19 has an advantage of preventing short-circuiting as illustrated in FIG. 5 (preventing a data signal line and a capacitor electrode from being short-circuited). This is because the liquid crystal panel does not need to be provided with a capacitor electrode (an electrode for maintaining a retention capacitance) as illustrated in FIG. 1.

Figure 20:
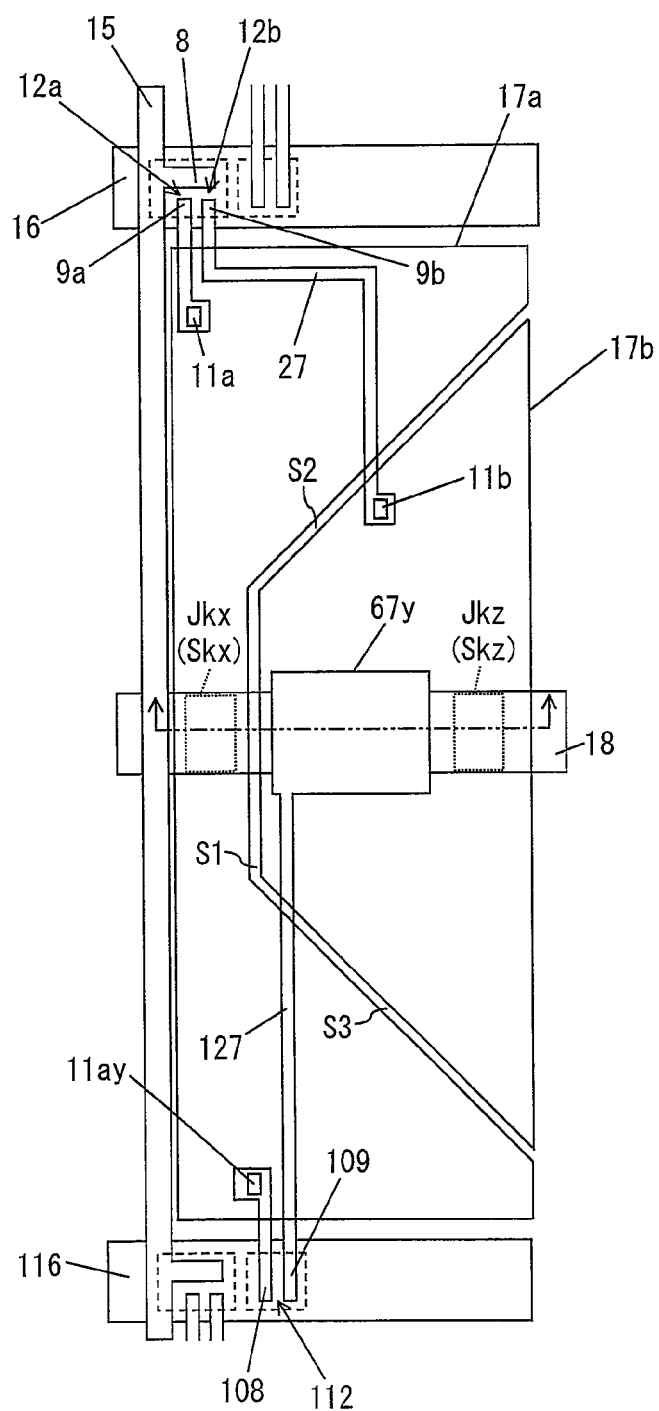
FIG. 20

FIG. 20 illustrates a fourth specific example of the pixel 101 (see FIG. 3), and FIG. 21 is a cross-sectional view of FIG. 20, taken on the line indicated by arrows. Note that FIG. 20 is identical to FIG. 10 in (i) shapes of the respective pixel electrodes 17a and 17b, (ii) how to provide the retention capacitor line 18, and (iii) how the pixel electrodes 17a and 17b are connected to the respective transistors. The coupling electrode 67y is provided in the center of the pixel so that (i) the coupling electrode 67y and (ii) each of the pixel electrode 17b and the retention capacitor line 18 overlap one another. The coupling electrode 67y and the retention capacitor line 18 overlap each other via the gate insulating film, and the coupling electrode 67y and the pixel electrode 17b overlap each other via the interlayer insulating film.

The gate insulating film should be formed thinner in the rectangular region Skx, (a) which is located between the coupling electrode 67y and the data signal line 15, when it is viewed from above and (b) in which the gate insulating film, the pixel electrode 17a, and the retention capacitor line 18 overlap each other, than in the region surrounding the rectangular region Skx (see FIG. 21). The gate insulating film should also be formed thinner in the rectangular region Skz, (a) which is located between the coupling electrode 67y and the data signal line adjacent to the data signal line 15, when it is viewed from above and (b) in which the gate insulating film, the pixel electrode 17b, and the retention capacitor line 18 overlap each other, than in the region surrounding the rectangular region Skz (see FIG. 21). Similarly, the interlayer insulating film should be formed thinner in the rectangular region Jkx, (a) which is located between the coupling electrode 67y and the data signal line 15, when it is viewed from above and (b) in which the interlayer insulating film, the pixel electrode 17a, and the retention capacitor line 18 overlap each other, than in the region surrounding the rectangular region Jkx (see FIG. 21). The interlayer insulating film should also be formed thinner in the rectangular region Jkz, (a) which is located between the coupling electrode 67y and the data signal line adjacent to the data signal line 15, when it is viewed from above and (b) in which the interlayer insulating film, the pixel electrode 17b, and the retention capacitor line 18 overlap each other, than in the region surrounding the rectangular region Jkz (see FIG. 21).

Specifically, in the active matrix substrate 3 of FIG. 21, the organic gate insulating film 20 is provided so as to cover the retention capacitor line 18, the inorganic gate insulating film 21, which is thinner than the organic gate insulating film 20, is provided on the organic gate insulating film 20, and the metal layer, in which the coupling electrode 67y and the data signal line 15 are provided, is provided on the inorganic gate insulating film 21. The inorganic interlayer insulating film 25 is provided so as to cover the metal layer, the organic interlayer insulating film 26, which is thicker than the inorganic interlayer insulating film 25, is provided on the inorganic interlayer insulating film 25, and the pixel electrodes 17a and 17b are provided on the organic interlayer insulating film 26. The coupling electrode 67y and the pixel electrode 17b overlap each other, via the inorganic interlayer insulating film 25 and the organic interlayer insulating film 26. This causes the retention capacitor Cx (see FIG. 3) to be defined.

The organic gate insulating film 21 should be hollowed in the rectangular region Skx (a) which is located between the coupling electrode 67y and the data signal line 15, when it is viewed from above and (b) in which the organic gate insulating film 21, the retention capacitor line 18, and the pixel electrode 17a overlap each other. The gate insulating film should also be hollowed in the rectangular region Skz (a) which is located between the coupling electrode 67y and the data signal line adjacent to the data signal line 15, when it is viewed from above and (b) in which the organic gate insulating film 21, the retention capacitor line 18, and the pixel electrode 17b overlap each other. Similarly, the organic interlayer insulating film 26 should be hollowed in the rectangular region Jkx (a) which is located between the coupling electrode 67y and the data signal line 15, when it is viewed from above and (b) in which the organic interlayer insulating film 26, the retention capacitor line 18, and the pixel electrode 17a overlap each other. The interlayer insulating film should also be hollowed in the rectangular region Jkz (a) which is located between the coupling electrode 67y and the data signal line adjacent to the data signal line 15, when it is viewed from above and (b) in which the organic interlayer insulating film 26, the retention capacitor line 18, and the pixel electrode 17b overlap each other. This causes (i) much of the retention capacitor Ch1 (see FIG. 3) to be defined by the part in which the retention capacitor line 18 located below the rectangular regions Jkx and Skx and the pixel electrode 17a located above the rectangular regions Jkx and Skx overlap each other only via the inorganic gate insulating film 21 and the inorganic interlayer insulating film 25 and (ii) much of the retention capacitor Ch2 (see FIG. 3) to be defined by the part in which the retention capacitor line 18 located below the rectangular regions and Jkz and Skz and the pixel electrode 17b located above the rectangular regions and Jkz and Skz overlap each other only via the inorganic gate insulating film 21 and the inorganic interlayer insulating film 25.

According to the liquid crystal panel illustrated in FIGS. 20 and 21, the first retention capacitor is defined by the part in which the pixel electrode 17a and the retention capacitor line 18 overlap each other only via the inorganic gate insulating film 21 and the inorganic interlayer insulating film 25, and the second retention capacitor is defined by the part in which the pixel electrode 17b and the retention capacitor line 18 overlap each other only via the inorganic gate insulating film 21 and the inorganic interlayer insulating film 25. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio.

The coupling electrode 67*y* is provided in the center of the pixel, and a distance between the coupling electrode 67*y* and the respective data signal lines is maintained. This can prevent the coupling electrode 67*y* and the respective data signal lines from being short-circuited.

The liquid crystal panel illustrated in FIGS. 20 and 21 has an advantage of preventing short-circuiting as illustrated in FIG. 5 (preventing a data signal line and a capacitor electrode from being short-circuited). This is because the liquid crystal panel does not need to be provided with a capacitor electrode (an electrode for maintaining a retention capacitance) as illustrated in FIG. 1.

It is preferable that the organic interlayer insulating film 26 of the liquid crystal panel illustrated in FIGS. 20 and 21 be hollowed also in the rectangular region Jky in which the organic interlayer insulating film 26 and the coupling electrode 67*y* overlap each other (see FIGS. 22 and 23). This brings about the aforementioned effects while sufficiently securing a capacitance of the coupling capacitor Cx (see FIG. 3).

Figure 24:
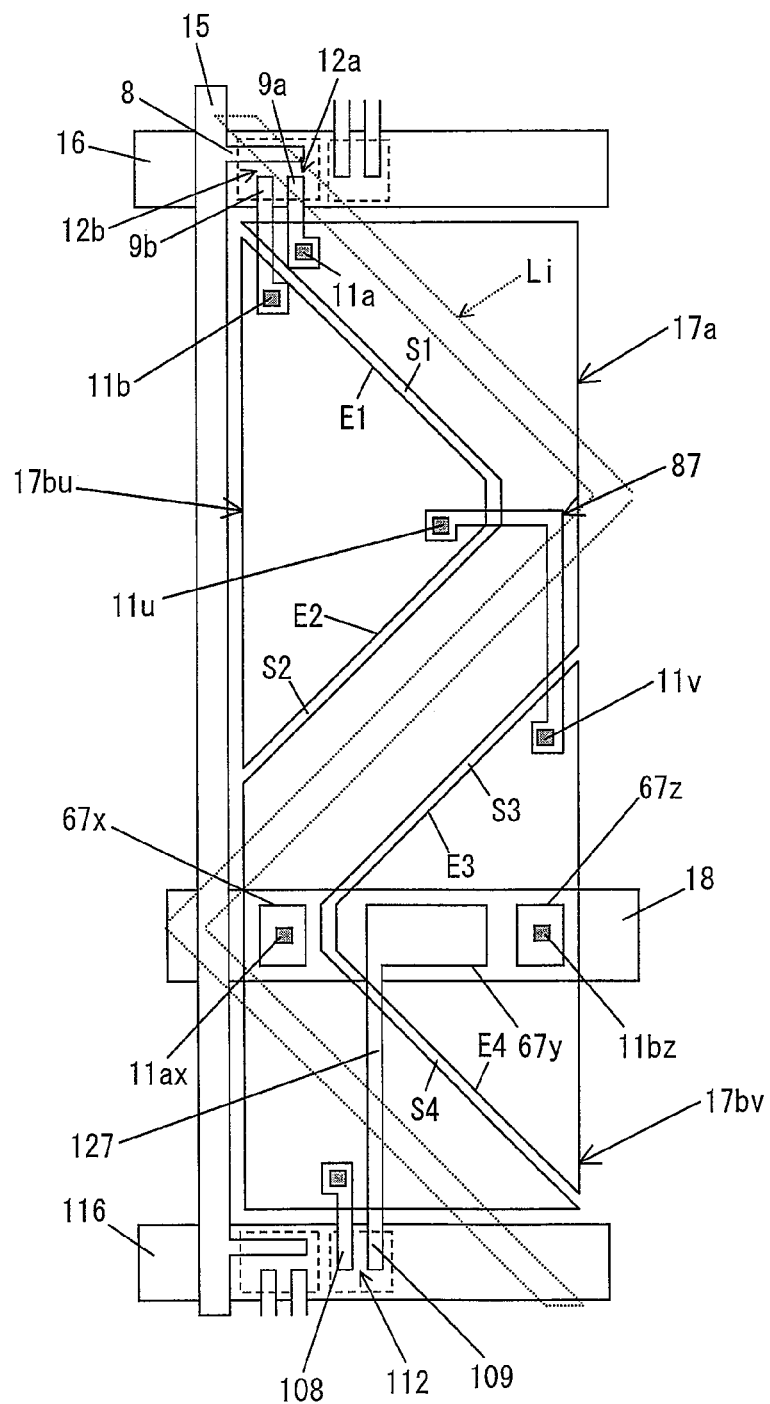
FIG. 24

FIG. 24 illustrates another specific example of the liquid crystal panel of the present embodiment. In the liquid crystal panel, there are provided the transistors 12*a* and 12*b*, the transistor 112, the pixel electrode 17*a*, pixel electrodes 17*bu* and 17*bv*, two capacitor electrodes (the first capacitor electrode 67*x* and the second capacitor electrode 67*z*), and the coupling electrode 67*y* (CE) (see FIG. 24). The transistors 12*a* and 12*b* are provided in the vicinity of the intersection of the data signal line 15 and the scanning signal line 16. The transistor 112 is provided in the vicinity of the intersection of the data signal line 15 and the scanning signal line 116. The pixel electrode 17*a* which is z-shaped when viewed in the row direction and the pixel electrodes 17*bu* and by each of which is shaped so as to fit the pixel electrode 17*a*, are aligned in the row direction in the pixel region defined by the data signal line and the scanning signal line 16. The first and second capacitor electrodes 67*x* and 67*z* and the coupling electrode 67*y* (CE) are provided in the layer in which the data signal line is provided. Note that the retention capacitor line 18 extends in the row direction so that the retention capacitor line 18 and the pixel electrodes 17*a* and 17*bv* overlap one another.

The pixel electrode 17*bu* which is provided in proximity to the transistor 12*a* is an isosceles trapezoid, and (i) its edges E1 and E2, which are at angles of 315° and 45° to the row direction, serve as respective two legs and (ii) two sides, which extend in the column direction, serve as upper and lower bases of the isosceles trapezoid, respectively. The pixel electrode 17*bv*, which has a shape identical to that of the pixel electrode 17*bu*, is an isosceles trapezoid, and (i) its edges E3 and E4, which are at angles of 45° and 315° to the row direction, serve as respective two legs and (ii) two sides, which extend in the column direction, serve as upper and lower bases of the isosceles trapezoid, respectively. The pixel electrodes 17*bu* and 17*bv* are provided so that the pixel electrode 17*bu* coincides with the pixel electrode 17*bv* when the pixel electrode 17*bu* is rotated by 180° about the pixel center. The pixel electrode 17*a* is z-shaped so that the respective pixel electrodes 17*bu* and 17*bv* fit the pixel electrode 17*a*. A gap between the edge E1 of the pixel electrode 17*bu* and a first edge of the pixel electrode 17*a* which edge is parallel to the edge E1 serves as an alignment controlling slit S1. A gap between the edge E2 of the pixel electrode 17*bu* and a second edge of the pixel electrode 17*a* which edge is parallel to the edge E2 serves as an alignment controlling slit S2. A gap between the edge E3 of the pixel electrode 17*bv* and a third edge of the pixel electrode 17*a* which edge is parallel to the edge E3 serves as an alignment controlling slit S3. A gap between the edge E4 of the pixel electrode 17*bv* and a fourth edge of the pixel electrode 17*a* which edge is parallel to the edge E4 serves as an alignment controlling slit S4.

Note here that (i) the first capacitor electrode 67*x*, the coupling electrode 67*y*, and the second capacitor electrode 67*z* are aligned in the row direction in this order so that each of them and the retention capacitor line 18 overlap each other via a gate insulating film (not illustrated), (ii) the first capacitor electrode 67*x* and the pixel electrode 17*a* overlap each other via an interlayer insulating film (not illustrated), and (iii) each of the coupling electrode 67*y* and the second capacitor electrode 67*z* and the pixel electrode 17*bv* overlap each other via the interlayer insulating film (not illustrated). Namely, the coupling electrode 67*y* is provided in the center of the pixel, and (i) the first capacitor electrode 67*x* is provided between one (the data signal line 15) of two adjacent data signal lines and the coupling electrode 67*y* and (ii) the second capacitor electrode 67*z* is provided between the other of the two adjacent data signal lines and the coupling electrode 67*y*, when the pixel 101 is viewed from above.

The transistors 12*a* and 12*b* have the source electrode 8 (the common source electrode) which is connected to the data signal line 15. The transistor 12*a* has the drain electrode 9*a* which is connected to the pixel electrode 17*a*, via the contact hole 11*a* and the wire drawn out of drain. The transistor 12*b* has the drain electrode 9*b* which is connected to the pixel electrode 17*bu*, via the contact hole 11*b* and the wire drawn out of drain. The pixel electrode 17*bu* and the pixel electrode 17*bv* are connected together via a junction wire 87. The transistor 112 has the source electrode 108 which is connected to the pixel electrode 17*a* and the drain electrode 109 which is connected to the coupling electrode 67*y* via the electrode 127 drawn out of drain. This causes a capacitor (corresponding to the coupling capacitor Cx of FIG. 3) to be defined by a part in which the coupling electrode 67*y* and the pixel electrode 17*b* overlap each other.

The first capacitor electrode 67*x* and the pixel electrode 17*a* are connected, via the contact hole 11*ax*, and the second capacitor electrode 67*z* and the pixel electrode 17*bv* are connected, via the contact hole 11*bz*. This causes (i) much of the retention capacitor Ch1 to be defined by the part in which the first capacitor electrode 67*x* and the retention capacitor line 18 overlap each other and (ii) much of the retention capacitor Ch2 to be defined by the part in which the second capacitor electrode 67*z* and the retention capacitor line 18 overlap each other.

According to the liquid crystal panel of FIG. 24, a first retention capacitor is defined by the part in which the first capacitor electrode 67*x* and the retention capacitor line 18 overlap each other only via the gate insulating film, and a second retention capacitor is defined by the part in which the second capacitor electrode 67*z* and the retention capacitor line 18 overlap each other only via the gate insulating film. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio.

Since the coupling electrode 67*y* is provided in the center of the pixel, it is possible to prevent the coupling electrode 67*y* and the data signal line from being short-circuited. Note that, in the case where the data signal line 15 and the first capacitor electrode 67*x* are short-circuited, it is possible to control the electric potentials of the respective pixel electrodes 17*a*, and 17*bu*, and 17*bv*, by trimming and removing the pixel electrode in the contact hole 11*ax* with the use of laser or the like. Same applies to a case where the second capacitor electrode 67*z* and the data signal line adjacent to the data signal line 15 are short-circuited. Even if the coupling electrode 67*y* and the second capacitor electrode 67*x* are short-circuited or the first capacitor electrode 67*z* and the coupling electrode 67*y* are short-circuited, the pixel electrodes 17*a*, 17*bu*, and 17*bv* have an identical electric potential at worst. As such, the electric potentials of the respective pixel electrodes 17*a*, 17*bu*, and 17*bv* will never be beyond control.

Figure 25:
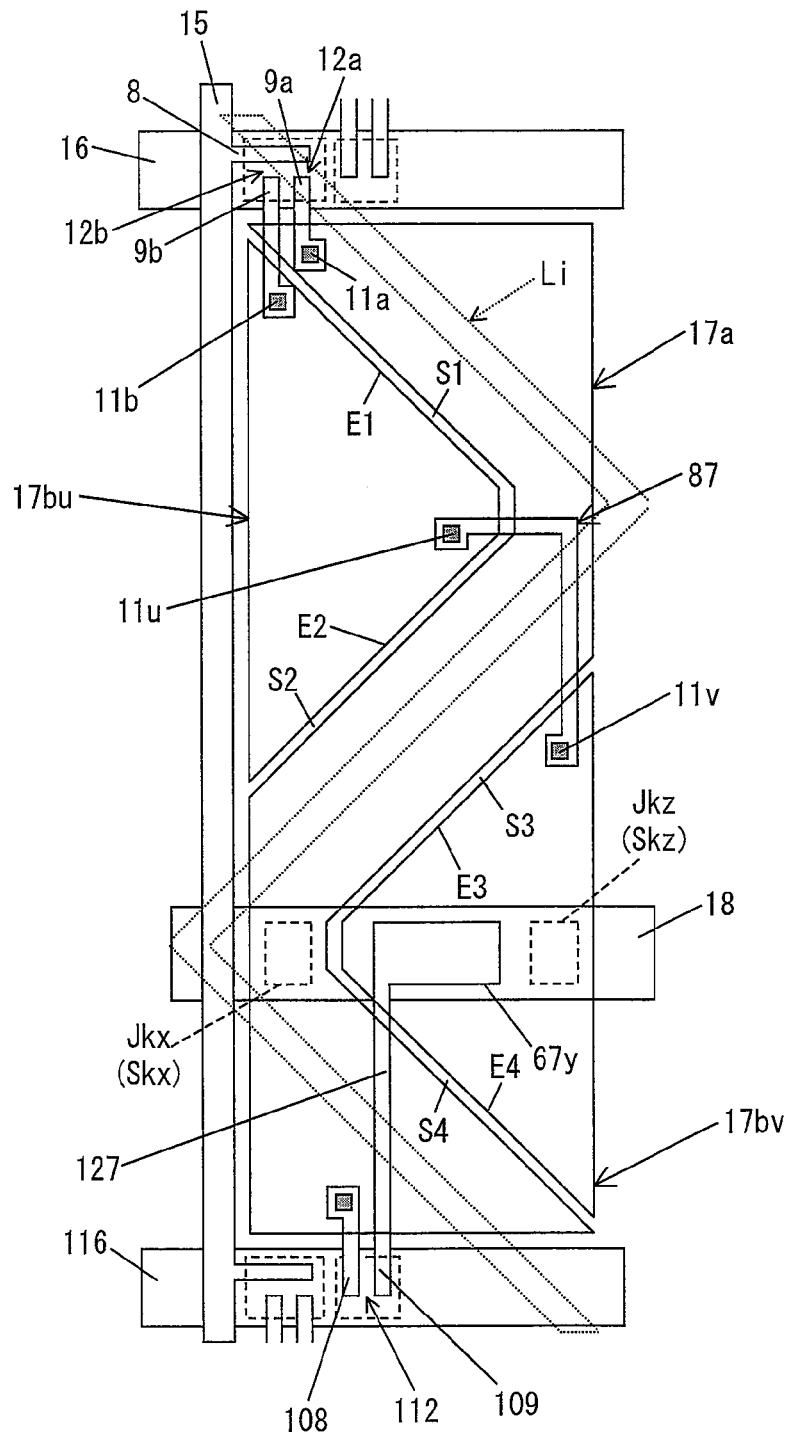
FIG. 25

FIG. 25 illustrates a further specific example of the liquid crystal panel of the present embodiment. FIG. 25 is identical to FIG. 24 in (i) shapes of the respective pixel electrodes 17*a*, and 17*bu*, and 17*bv*, (ii) how to provide the retention capacitor line 18, and (iii) how the pixel electrodes 17*a* and 17*b* are connected to the respective transistors. The coupling electrode 67*y* is provided in the center of the pixel so that (i) the coupling electrode 67*y* and (ii) each of the pixel electrode 17*bv* and the retention capacitor line 18 overlap one another.

The coupling electrode 67*y* and the pixel electrode 17*bv* overlap each other, via the interlayer insulating film which serves as the channel protection film. The coupling electrode 67*y* and the retention capacitor line 18 overlap each other, via the gate insulating film. This causes the capacitor (corresponding to the coupling capacitor Cx of FIG. 3) to be defined by the part in which the coupling electrode 67*y* and the pixel electrode 17*bv* overlap each other.

For example, the gate insulating film has a uniform thickness, while the interlayer insulating film should be (i) hollowed in a rectangular region Jkx (a) which is located between the coupling electrode 67*y* and the data signal line 15, when it is viewed from above and (b) in which the interlayer insulating film, the pixel electrode 17*a*, and the retention capacitor line 18 overlap each other or (ii) formed thinner in the rectangular region Jkx than in a region surrounding the rectangular region Jkx. The interlayer insulating film should also be (i) hollowed in a rectangular region Jkz (a) which is located between the coupling electrode 67*y* and the data signal line adjacent to the data signal line 15, when it is viewed from above and (b) in which the interlayer insulating film, the pixel electrode 17*bv*, and the retention capacitor line 18 overlap each other or (ii) formed thinner in the rectangular region Jkz than in a region surrounding the rectangular region Jkz.

Alternatively, for example, the interlayer insulating film and the gate insulating film can be arranged as below. Namely, the interlayer insulating film can have a uniform thickness, while the gate insulating film can be hollowed in a rectangular region Skx (a) which is located between the coupling electrode 67*y* and the data signal line 15, when it is viewed from above and (b) in which the gate insulating film, the pixel electrode 17*a*, and the retention capacitor line 18 overlap each other or (ii) formed thinner in the rectangular region Skx than in a region surrounding the rectangular region Skx. The gate insulating film can also be hollowed in a rectangular region Skz (a) which is located between the coupling electrode 67*y* and the data signal line adjacent to the data signal line 15, when it is viewed from above and (b) in which the gate insulating film, the pixel electrode 17*bv*, and the retention capacitor line 18 overlap each other or (ii) formed thinner in the rectangular region Skz than in a region surrounding the rectangular region Skz.

Alternatively, for example, the interlayer insulating film and the gate insulating film can be arranged as below. Namely, the interlayer insulating film can be formed thinner in the rectangular region Jkx, (a) which is located between the coupling electrode 67*y* and the data signal line 15, when it is viewed from above and (b) in which the interlayer insulating film, the pixel electrode 17*a*, and the retention capacitor line 18 overlap each other, than in the region surrounding the rectangular region Jkx. The interlayer insulating film can also be formed thinner in the rectangular region Jkz, (a) which is located between the coupling electrode 67*y* and the data signal line adjacent to the data signal line 15, when it is viewed from above and (b) in which the interlayer insulating film, the pixel electrode 17*bv*, and the retention capacitor line 18 overlap each other, than in the region surrounding the rectangular region Jkz. In contrast, the gate insulating film can be formed thinner in the rectangular region Skx, (a) which is located between the coupling electrode 67*y* and the data signal line 15, when it is viewed from above and (b) in which the gate insulating film, the pixel electrode 17*a*, and the retention capacitor line 18 overlap each other, than in the region surrounding the rectangular region Skx. The gate insulating film can also be formed thinner in the rectangular region Skz, (a) which is located between the coupling electrode 67*y* and the data signal line adjacent to the data signal line 15, when it is viewed from above and (b) in which the gate insulating film, the pixel electrode 17*bv*, and the retention capacitor line 18 overlap each other, than in the region surrounding the rectangular region Skz.

According to these arrangements, the first retention capacitor to be defined by the part in which the pixel electrode 17*a* and the retention capacitor line 18 overlap each other, only via (i) the gate insulating film, (ii) the gate insulating film and a thin part of the interlayer insulating film, (iii) the interlayer insulating film, (iv) a thin part of the gate insulating film and the interlayer insulating film, or (v) the thin part of the gate insulating film and the thin part of the interlayer insulating film. That also causes the second retention capacitor to be defined by the part in which the pixel electrode 17*bv* and the retention capacitor line 18 overlap each other only via (i) the gate insulating film, (ii) the gate insulating film and a thin part of the interlayer insulating film, (iii) the interlayer insulating film, (iv) a thin part of the gate insulating film and the interlayer insulating film, or (v) the thin part of the gate insulating film and the thin part of the interlayer insulating film. The insulator parts of the respective first and second retention capacitors are thinner as compared to the case of the conventional arrangement (see FIG. 36). Accordingly, it is possible to secure a required retention capacitance even if the retention capacitor line 18 which is light blocking has a smaller area (e.g., even if the retention capacitor line 18 has a smaller width). This allows an increase in pixel aperture ratio. Since the coupling electrode 67*y* is provided in the center of the pixel and a distance between the coupling electrode 67*y* and the respective data signal lines is maintained, it is possible to prevent the coupling electrode 67*y* and the data signal line from being short-circuited.

The liquid crystal panel illustrated in FIG. 25 has an advantage of preventing short-circuiting (preventing a data signal line and a capacitor electrode from being short-circuited). This is because the liquid crystal panel does not need to be provided with a capacitor electrode (an electrode for maintaining a retention capacitance) as illustrated in FIG. 24.

Note that it is preferable that the organic interlayer insulating film 26 of the liquid crystal panel illustrated in FIG. 25 be formed thin also in the rectangular region Jky in which the interlayer insulating film and the coupling electrode 67*y* overlap each other (see FIG. 26). This brings about the aforementioned effects while sufficiently securing a capacitance of the capacitor defined by the coupling electrode 67*y* and the pixel electrode 17*bv* (corresponding to the coupling capacitor Cx of FIG. 3).

Figure 27:
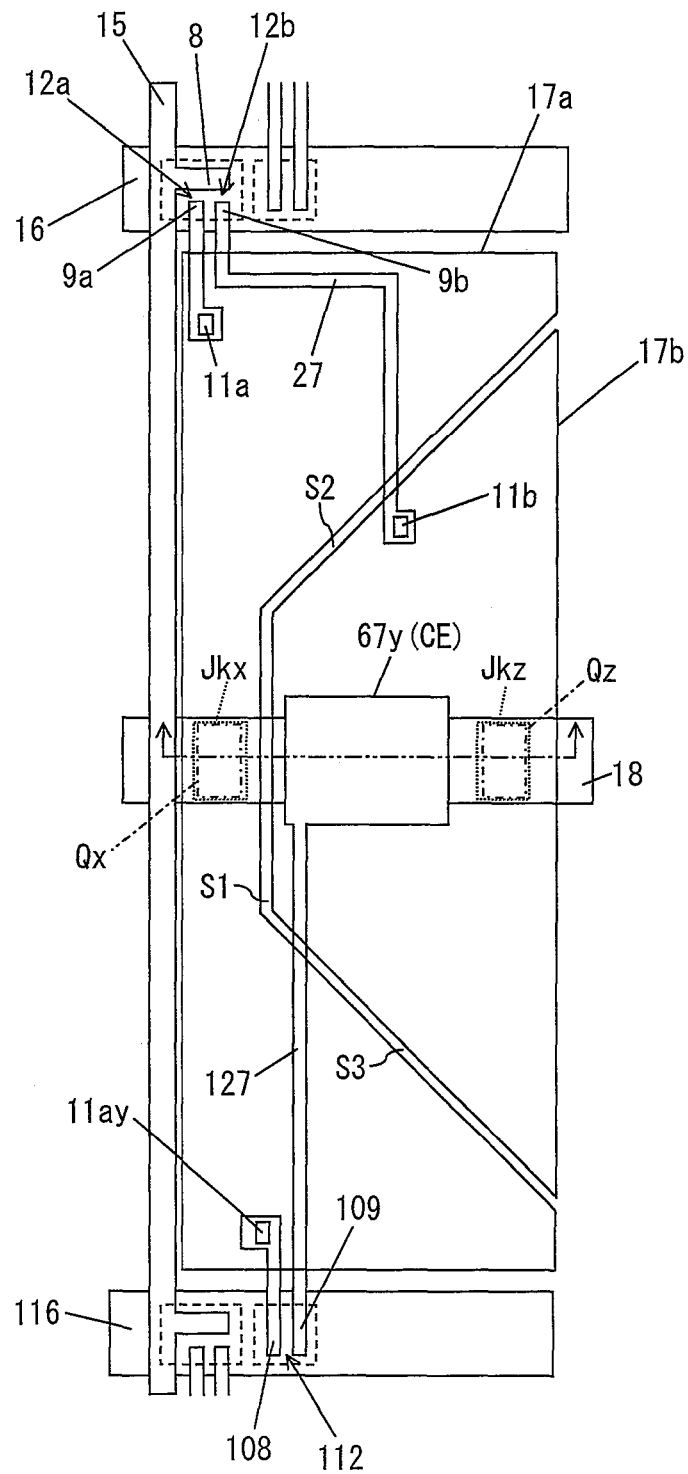
FIG. 27
Figure 28:
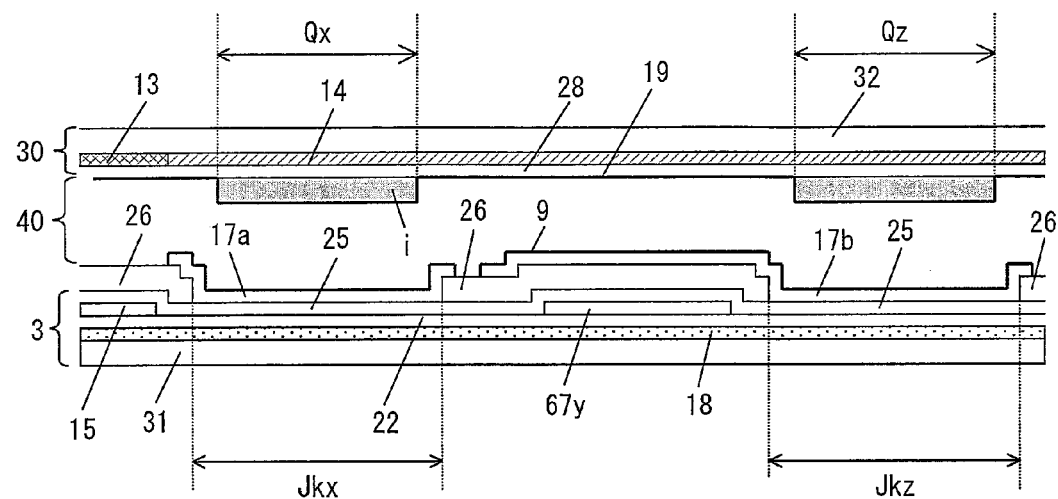
FIG. 28
Figure 29:
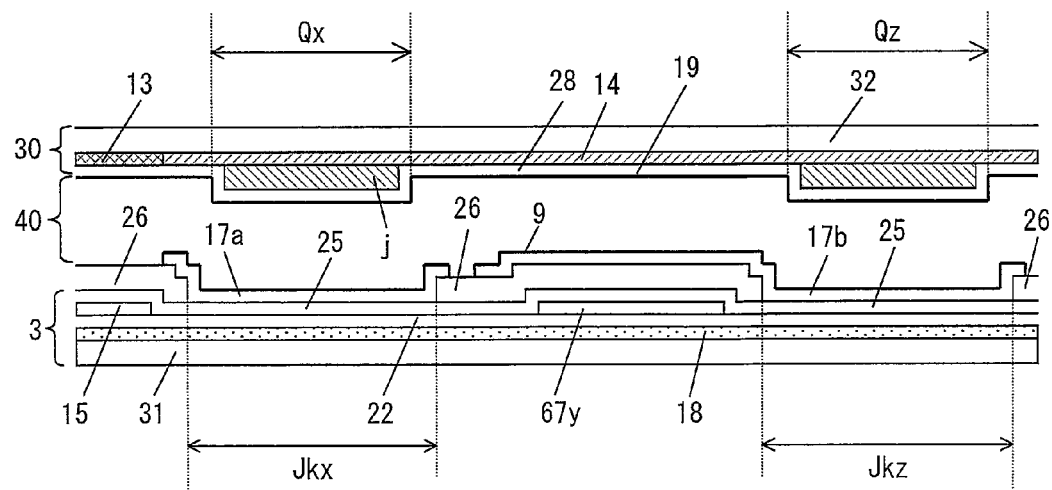
FIG. 29

The liquid crystal panel illustrated in FIG. 12 can also be arranged as illustrated in FIGS. 27 through 29. Each color filter substrate of the liquid crystal panel illustrated in FIGS. 27 through 29 has protrusions Qx and Qz which protrude from the surface of the each color filter substrate so as to respectively correspond to hollowed parts Jkx and Jkz of the organic interlayer insulating film 26 of the active matrix substrate 3. Since this compensates for hollows in a surface of the active matrix substrate due to the hollowed parts Jkx and Jkz, the liquid crystal layer under the protrusions Qx and Qz can be substantially equivalent in thickness to the surrounding part of the liquid crystal layer. This allows (i) the liquid crystal layer to have a uniform thickness and (ii) liquid crystal to be used in a reduced amount. In FIG. 28, protruding members i are provided on the counter electrode 28, and serve as the respective protrusions Qx and Qz on the surface of the color filter substrate. This can prevent the pixel electrode 17a or 17b and the counter electrode 28 from being short-circuited even if an electroconductive foreign matter falls into the hollows in the surface of the active matrix substrate. Note that, in the case of an MVA liquid crystal panel, the protruding member i and an alignment controlling rib can be formed in a single process. In FIG. 29, protruding members j are provided on the colored layer 14 (under the counter electrode 28), and serve as the protrusions Qx and Qz. The protrusions Qx and Qz can also be formed by causing (i) the colored layer 14 and (ii) the protruding member j which serves as a colored layer whose color is different from that of the colored layer 14 (e.g., an R colored layer and a G colored layer), to overlap each other. This provides the advantage that it is unnecessary to separately provide any protruding member (by use of another material). According to the arrangement of FIG. 29, it is possible to reduce a distance, in the protrusions Qx and Qz, between the respective pixel electrodes 17a and 17b and the counter electrode 28, as compared to an arrangement in which no protrusions Qx and Qz are provided. This allows an increase in liquid crystal capacitance.

Note that it is preferable that the protrusions Qx and Qz be located between two edges of the retention capacitor line 18 which extend in the row direction when the protrusions Qx and Qz are projected onto a layer in which the retention capacitor line 18 is provided (see FIG. 27). This makes it difficult for an alignment disorder of liquid crystal molecules to be visible due to the protrusions Qx and Qz on the color filter substrate.

Note also that such an arrangement in which protrusions are provided on a surface of a color filter substrate can be applied not only to the liquid crystal panel of FIG. 12 but also to the liquid crystal panels of FIGS. 7, 11, 14, 16, 18, 19, 21, and 23.

The liquid crystal panel of FIG. 3 can also be modified as illustrated in FIG. 35. Namely, a capacitor (cy) is defined only by a control electrode CE and a retention capacitor line 18. The control electrode CE is connected to a pixel electrode 17b via a transistor 112 (a transistor which is connected to a scanning signal line 116 to be scanned subsequently to a scanning signal line 16). Note that a retention capacitor (Ch1) is defined by a pixel electrode 17a and the retention capacitor line 18, and a retention capacitor (Ch2) is defined by the pixel electrode 17b and the retention capacitor line 18.

In a case where a liquid crystal display device is driven in which the liquid crystal panel of the present embodiment is employed, $|va| \geq |vb|$ (note that, for example, $|vb|$ refers to the electric potential difference between vb and the com electric potential (=Vcom)), where (i) va indicates an electric potential of the pixel electrode 17a which electric potential is obtained after the transistor 112 has turned off and (ii) vb indicates an electric potential of the pixel electrode 17b which electric potential is obtained after the transistor 112 has turned off. Therefore, the halftone display can be carried out by area coverage modulation which is achieved by a pair of bright subpixel and dark subpixel. Here, a subpixel including the pixel electrode 17a is referred to as the bright subpixel, and a subpixel including the pixel electrode 17b is referred to as the dark subpixel. This allows an improvement in viewing angle characteristic of the liquid crystal display device in accordance with the present embodiment.

Specific examples of a pixel 101 of FIG. 35 are illustrated in FIG. 36 and FIG. 37 which is a cross-sectional view of FIG. 36, taken on the line indicated by arrows. The pixel 101 of FIG. 36 is arranged as in the case of the pixel 101 of FIG. 1, except that a source electrode 108 of a transistor 112 is connected to a pixel electrode 17b via a contact hole 11by. Note that, since a thick organic matter containing layer 26 is provided in an interlayer insulating film located on a channel of a transistor, no capacitor (a vanishingly small capacitor) is defined by a part in which a control electrode 67y (CE) and a pixel electrode 17b overlap each other. Instead, a capacitor (Cy) (see FIG. 35) is defined only by a part in which the control electrode 67y and a retention capacitor line 18 overlap each other (see FIG. 37).

According to the present embodiment, the liquid crystal display unit and the liquid crystal display device of the present invention are arranged as below. Namely, two polarization plates A and B are provided on respective sides of the liquid crystal panel of the present invention so that polarization axes of the respective polarization plates A and B intersect at right angles. Note that optical compensation sheets or the like can be provided on the respective polarization plates according to need. Next, drivers (a gate driver 202 and a source driver 201) are connected (see FIG. 30(a)). As an example, a connection of the drivers by a TCP method is described here. First, an ACF is temporarily pressure-bonded on a terminal section of the liquid crystal panel. Subsequently, driver TCPs are punched out from a carrier tape and then positioned with respect to a panel terminal electrode, so as to be finally heated and pressure-bonded. Thereafter, (i) circuit boards 209 (PWB) via which the driver TCPs are connected to one another and (ii) input terminals of the respective driver TCPs, are connected to one another via the ACF. This completes a liquid crystal display unit 200. Thereafter, a display control circuit 209 is connected to the drivers (201 and 202) of the liquid crystal display unit via circuit boards 203 so as to be integral with an illumination device (a backlight unit) 204. a liquid crystal display device 210 is thus prepared (see FIG. 30(b)).

FIG. 31 is a block diagram illustrating an arrangement of the liquid crystal display device of the present embodiment. The liquid crystal display device of the present embodiment includes a display section (liquid crystal panel), a source driver (SD), a gate driver (GD), and a display control circuit. The source driver drives data signal lines, the gate driver drives scanning signal lines, and the display control circuit controls the source driver and the gate driver.

The display control circuit receives, from an external signal source (e.g., tuner), a digital video signal Dv indicative of an image to be displayed, a horizontal synchronization signal HSY and a vertical synchronization signal VSY which correspond to the digital video signal Dv, and a control signal Dc for controlling a display operation. In response to the digital video signal Dv, the horizontal synchronization signal HSY, the vertical synchronization signal VSY, and the control signal Dc thus received, the display control circuit generates and outputs, as signals for causing the display section to display an image indicated by the digital video signal Dv, the following signals: a data start pulse signal SSP; a data clock signal SCK; a digital image signal DA indicative of the image to be displayed (i.e., a signal corresponding to the digital video signal Dv); a gate start pulse signal GSP; a gate clock signal GCK; and a gate driver output control signal (scanning signal output control signal) GOE.

More specifically, in the display control circuit, the digital video signal Dv is subjected to timing adjustment etc. in an internal memory, as needed. Then, the digital video signal Dv is outputted from the display control circuit as the digital image signal DA. The display control circuit generates the data clock signal SCK as a signal having pulses corresponding to pixels of the image indicated by the digital image signal DA. The display control circuit (i) generates, in response to the horizontal synchronization signal HSY, the data start pulse signal SSP as a signal which has a High level only for a predetermined period in each horizontal scanning period, (ii) generates, in response to the vertical synchronization signal VSY, the gate start pulse signal GSP as a signal which has an H level only for a predetermined period in each frame period (i.e., in each vertical scanning period), (iii) generates, in response to the horizontal synchronization signal HSY, the gate clock signal GCK, and (iv) generates the gate driver output control signal GOE in response to the horizontal synchronization signal HSY and the control signal Dc.

Of signals thus generated in the display control circuit, the digital image signal DA, a polarity inversion signal POL for controlling a polarity of a signal electric potential (data signal electric potential), the data start pulse signal SSP, and the data clock signal SCK are supplied from the display control circuit to the source driver. The gate start pulse signal GSP, the gate clock signal GCK, and the gate driver output control signal GOE are supplied from the display control circuit to the gate driver.

In response to the digital image signal DA, the data clock signal SCK, the data start pulse signal SSP, and the polarity inversion signal POL, the source driver sequentially generates, in each horizontal scanning period, analog electric potentials (signal electric potentials) corresponding to respective pixel values of the image indicated by the digital image signal DA for each of the scanning signal lines. The data signals thus generated are supplied from the source driver to the data signal lines.

In response to the gate start pulse signal GSP, the gate clock signal GCK, and the gate driver output control signal GOE, the gate driver generates gate ON pulse signals, and supplies the gate ON pulse signals to the respective scanning signal lines. This causes the scanning signal lines to be selectively driven.

Thus, the source driver drives the data signal lines of the display section (liquid crystal panel) while the gate driver drives the scanning signal lines of the display section. This causes a signal electric potential to be written from a data signal line to a pixel electrode, via a transistor (TFT) connected with a selected scanning signal line. This causes a voltage to be applied to a liquid crystal layer corresponding to each of subpixels so that a transmitted amount of light emitted from a backlight is controlled. As a result, the image indicated by the digital video signal Dv is displayed by each of the subpixels.

The following describes an example of how a television receiver, to which the liquid crystal display device is applied, is arranged. FIG. 32 is a block diagram illustrating an arrangement of a liquid crystal display device 800 for use in a television receiver. The liquid crystal display device 800 includes a liquid crystal display unit 84, an Y/C separation circuit 80, a video chroma circuit 81, an A/D converter 82, a liquid crystal controller 83, a backlight drive circuit 85, a backlight 86, a microcomputer 87, and a gradation voltage generating circuit 88. The liquid crystal display unit 84 includes a liquid crystal panel, and a source driver and a gate driver which are provided for driving the liquid crystal panel.

According to the liquid crystal display device 800, a composite color video signal Scv which is a television signal is externally supplied to the Y/C separation circuit 80 so as to be split into a luminance signal and a color signal. The luminance signal and the color signal are converted by the video chroma circuit 81 into analog RGB signals corresponding to respective three primary colors of light. The analog RGB signals are further converted by the A/D converter 82 into respective digital RGB signals. The digital RGB signals are supplied to the liquid crystal controller 83. In the Y/C separation circuit 80, a horizontal synchronization signal and a vertical synchronization signal are also extracted from the composite color video signal Scv so as to be also supplied to the liquid crystal controller 83 via the microcomputer 87.

The digital RGB signals and a timing signal which varies depending on the horizontal synchronization signal and the vertical synchronization signal are supplied, at a predetermined timing, from the liquid crystal controller 83 to the liquid crystal display unit 84. The gradation voltage generating circuit 88 generates gradation electric potentials for the respective three primary colors R, G, and B for color image display. Their gradation electric potentials are also supplied to the liquid crystal display unit 84. In response to the digital RGB signals, the timing signal, and the gradation electric potentials, the liquid crystal display unit 84 generates drive signals (data signals=signal electric potentials, scanning signals, etc.) by use of a source driver, a gate driver, etc of the liquid crystal display unit 84. In response to the drive signals, a color image is displayed on the liquid crystal panel of the liquid crystal display unit 84. In order to cause the liquid crystal display unit 84 to display an image, it is necessary to emit light from behind the liquid crystal panel in the liquid crystal display unit 84. In the liquid crystal display device 800, the backlight drive circuit 85 drives the backlight 86 under control of the microcomputer 87. This causes a back surface of the liquid crystal panel to be irradiated with light. Control of an entire system, including this process, is carried out by the microcomputer 87. It is possible to use, as an externally-supplied video signal (composite color video signal), not only a video signal which is in conformity with a television broadcast but also a video signal of an image captured by a camera, a video signal supplied via the Internet, etc. Thus, the liquid crystal display device 800 can display images in accordance with various video signals.

In a case where the liquid crystal display device 800 displays an image which is in conformity with a television broadcast, a tuner section 90 is connected with the liquid crystal display device 800 as illustrated in FIG. 33. Thus, a television receiver 701 is realized. The tuner section 90 selects, among airwaves (high-frequency signals) received via an antenna (not illustrated), a signal of a channel to be received, converts the signal into an intermediate frequency signal, and then demodulates the intermediate frequency signal. Thus, the composite color video signal Scv is extracted from the intermediate frequency signal as a television signal. The composite color video signal Scv is supplied to the liquid crystal display device 800, as described above. Then, the liquid crystal display device 800 displays an image in accordance with the composite color video signal Scv.

FIG. 34 is an exploded perspective view illustrating one arrangement example of the television receiver. As illustrated in FIG. 39, the television receiver includes, as its components, a first housing 801 and a second housing 802, in addition to the liquid crystal display apparatus 800. The television receiver is arranged such that the liquid crystal display apparatus 800 is sandwiched between and enwrapped by the first housing 801 and the second housing 806. The first housing 801 has an opening 801a through which an image to be displayed by the liquid crystal display apparatus 800 passes. The second housing 806 is a member for covering a backside of the liquid crystal display apparatus 800. The second housing 806 includes an operation circuit 805 for operating the liquid crystal display apparatus 800. In addition, a supporting member 808 is provided to a lower part of the second housing 806.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

An active matrix substrate of the present invention and a liquid crystal panel including the active matrix substrate are suitably applicable to, e.g., a liquid crystal television.

REFERENCE SIGNS LIST

101-104 Pixel
12a•12b•112 Transistor
15 Data signal line
16•116 Scanning signal line
17a•17b Pixel electrode
18 Retention capacitor line
20 Organic gate insulating film
21 Inorganic gate insulating film
22 Gate insulating film
25 Inorganic interlayer insulating film
26 Organic interlayer insulating film
56 Interlayer insulating film
67x•67z First capacitor electrode • Second capacitor electrode
67y Coupling electrode
701 Television receiver
800 Liquid crystal display device

The invention claimed is:

1. An active matrix substrate comprising:
   data signal lines extending in a column direction;
   scanning signal lines extending in a row direction;
   each first transistor connected to a corresponding one of the data signal lines and a corresponding one of the scanning signal lines;
   each second transistor connected to the corresponding one of the data signal lines and the corresponding one of the scanning signal lines;
   each third transistor connected to a scanning signal line adjacent to the corresponding one of the scanning signal lines; and
   retention capacitor lines, wherein
   in each pixel region, (i) a first pixel electrode connected to the each first transistor, (ii) a second pixel electrode connected to the each second transistor, and (iii) a coupling electrode, being provided,
   each of the first and second pixel electrodes and a corresponding one of the retention capacitor lines overlapping one another,
   a capacitor being defined by the coupling electrode and the second pixel electrode, the coupling electrode being connected to the first pixel electrode via the each third transistor,
   at least a first region of an insulating layer and at least a second region of the insulating layer being provided thinner than their surrounding regions, the insulating layer being provided between a layer in which the corresponding one of the retention capacitor lines is provided and a layer in which the first and second pixel electrodes are provided, the first region being at least a part in which the insulating layer and each of the corresponding one of the retention capacitor lines and the first pixel electrode overlap each other, and the second region being at least a part in which the insulating layer and each of the corresponding one of the retention capacitor lines and the second pixel electrode overlap each other,
   the insulating layer has a structure in which a gate insulating film and an interlayer insulating film which covers a channel of a transistor are stacked, and
   the gate insulating film is removed in (i) said first region of the insulating film and (ii) said second region of the insulating film.

2. The active matrix substrate as set forth in claim 1, wherein the interlayer insulating film is removed in (i) said first region of the insulating film and (ii) said second region of the insulating film.

3. The active matrix substrate as set forth in claim 1, wherein the interlayer insulating film is provided thinner, than in the surrounding regions, in (i) said first region of the insulating film and (ii) said second region of the insulating film.

4. The active matrix substrate as set forth in claim 3, wherein:
   the interlayer insulating film has a structure in which an inorganic interlayer insulating film and an organic interlayer insulating film are stacked; and
   in (i) said first region of the interlayer insulating film and (ii) said second region of the interlayer insulating film, the organic interlayer insulating film is provided thinner than the surrounding regions or the organic interlayer insulating film is removed.

5. An active matrix substrate comprising:
   data signal lines extending in a column direction;
   scanning signal lines extending in a row direction;
   each first transistor connected to a corresponding one of the data signal lines and a corresponding one of the scanning signal lines;
   each second transistor connected to the corresponding one of the data signal lines and the corresponding one of the scanning signal lines;
   each third transistor connected to a scanning signal line adjacent to the corresponding one of the scanning signal lines; and
   retention capacitor lines, wherein
   in each pixel region, (i) a first pixel electrode connected to the each first transistor, (ii) a second pixel electrode connected to the each second transistor, and (iii) a coupling electrode, being provided,
   each of the first and second pixel electrodes and a corresponding one of the retention capacitor lines overlapping one another,
   a capacitor being defined by the coupling electrode and the second pixel electrode, the coupling electrode being connected to the first pixel electrode via the each third transistor,
   at least a first region of an insulating layer and at least a second region of the insulating layer being provided thinner than their surrounding regions, the insulating layer being provided between a layer in which the corresponding one of the retention capacitor lines is provided and a layer in which the first and second pixel electrodes are provided, the first region being at least a part in which the insulating layer and each of the corresponding one of the retention capacitor lines and the first pixel electrode overlap each other, and the second region being at least a part in which the insulating layer and each of the corresponding one of the retention capacitor lines and the second pixel electrode overlap each other, the insulating layer has a structure in which a gate insulating film and an interlayer insulating film which covers a channel of a transistor are stacked, and the gate insulating film is provided thinner, than in the surrounding regions, in (i) said first region of the insulating film and (ii) said second region of the insulating film.

6. The active matrix substrate as set forth in claim 5, wherein:

the gate insulating film has a structure in which an organic gate insulating film and an inorganic gate insulating film are stacked; and in (i) said first region of the gate insulating film and (ii) said second region of the gate insulating film, the organic gate insulating film is provided thinner than the surrounding regions or the organic gate insulating film is removed.

7. The active matrix substrate as set forth in claim 1, wherein the coupling electrode and the second pixel electrode overlap each other via the interlayer insulating film.

8. The active matrix substrate as set forth in claim 1, wherein the coupling electrode and the corresponding one of the retention capacitor lines overlap each other via the gate insulating film.

9. The active matrix substrate as set forth in claim 5, wherein the interlayer insulating film is removed in (i) said first region of the insulating film and (ii) said second region of the insulating film.

10. The active matrix substrate as set forth in claim 5, wherein the interlayer insulating film is provided thinner, than in the surrounding regions, in (i) said first region of the insulating film and (ii) said second region of the insulating film.

11. The active matrix substrate as set forth in claim 10, wherein:

the interlayer insulating film has a structure in which an inorganic interlayer insulating film and an organic interlayer insulating film are stacked; and in (i) said first region of the interlayer insulating film and (ii) said second region of the interlayer insulating film, the organic interlayer insulating film is provided thinner than the surrounding regions or the organic interlayer insulating film is removed.

12. The active matrix substrate as set forth in claim 5, wherein the coupling electrode and the second pixel electrode overlap each other via the interlayer insulating film.

13. The active matrix substrate as set forth in claim 5, wherein the coupling electrode and the corresponding one of the retention capacitor lines overlap each other via the gate insulating film.

* * * * *